US012114287B2

(12) United States Patent
Xu et al.

(10) Patent No.: US 12,114,287 B2
(45) Date of Patent: Oct. 8, 2024

(54) PAGE INDICATION FOR IDLE OR INACTIVE STATE USER EQUIPMENT (UE)

(71) Applicant: QUALCOMM Incorporated, San Diego, CA (US)

(72) Inventors: Huilin Xu, Temecula, CA (US); Yuchul Kim, San Diego, CA (US); Wanshi Chen, San Diego, CA (US); Peter Gaal, San Diego, CA (US); Ozcan Ozturk, San Diego, CA (US); Jing Lei, San Diego, CA (US); Hwan Joon Kwon, San Diego, CA (US); Peter Pui Lok Ang, San Diego, CA (US); Krishna Kiran Mukkavilli, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/451,294

(22) Filed: Oct. 18, 2021

(65) Prior Publication Data
US 2022/0124672 A1 Apr. 21, 2022

Related U.S. Application Data

(60) Provisional application No. 63/094,077, filed on Oct. 20, 2020.

(51) Int. Cl.
*H04W 72/1273* (2023.01)
*H04L 5/00* (2006.01)
(Continued)

(52) U.S. Cl.
CPC ........... *H04W 68/005* (2013.01); *H04L 5/005* (2013.01); *H04W 72/044* (2013.01);
(Continued)

(58) Field of Classification Search
CPC ............. H04W 68/005; H04W 72/044; H04W 72/1273; H04W 72/23; H04W 72/51;
(Continued)

(56) References Cited

U.S. PATENT DOCUMENTS 1,206,635 A * 11/1916 Woods .................... H04R 1/38
369/163
10,785,747 B2 * 9/2020 Kim .................... H04W 68/005
(Continued)

FOREIGN PATENT DOCUMENTS

CA 2750554 C * 10/2014 .......... H04W 68/025
WO WO-2019243450 A1 * 12/2019 ............ H04W 48/12
(Continued)

OTHER PUBLICATIONS

Sierra Wireless: "CSS paging Discussion", 3rd Generation Partnership Project (3GPP), RAN WG1, R1-157180 (Nov. 2015) (Year: 2015).*
(Continued)

*Primary Examiner* — Yuwen Pan
*Assistant Examiner* — Swati Jain
(74) *Attorney, Agent, or Firm* — MG-IP Law, P.C.

(57) ABSTRACT

Disclosed are techniques for wireless communication. In an aspect, a user equipment (UE) receives, from a base station, before a next paging occasion (PO) of a paging cycle, a page indication (PI) in a first PI location associated with the next PO, wherein the PI comprises at least one repetition of a plurality of repetitions of the PI transmitted in the first PI location on each of a plurality of beams, and decodes the PI to determine whether or not the UE is paged in the next PO.

37 Claims, 15 Drawing Sheets

(51) Int. Cl.
*H04W 68/00* (2009.01)
*H04W 72/044* (2023.01)
*H04W 72/23* (2023.01)
*H04W 72/51* (2023.01)

(52) U.S. Cl.
CPC ....... *H04W 72/1273* (2013.01); *H04W 72/23* (2023.01); *H04W 72/51* (2023.01)

(58) Field of Classification Search
CPC .... H04W 68/025; H04L 5/005; H04L 5/0053; H04L 5/0078; H04L 5/0023; H04L 5/0048

See application file for complete search history.

(56) References Cited

U.S. PATENT DOCUMENTS

| | | | | |
|---|---|---|---|---|
| 11,184,874 | B2* | 11/2021 | Yoon | H04W 16/28 |
| 11,419,093 | B2* | 8/2022 | Babaei | H04W 72/23 |
| 2005/0195852 | A1* | 9/2005 | Vayanos | H04W 48/12 |
| | | | | 370/437 |
| 2012/0020305 | A1* | 1/2012 | Hole | H04W 72/51 |
| | | | | 370/329 |
| 2016/0360504 | A1* | 12/2016 | Wang | H04W 68/025 |
| 2017/0201963 | A1* | 7/2017 | Zhang | H04W 76/28 |
| 2017/0303235 | A1* | 10/2017 | Deogun | H04W 68/02 |
| 2018/0070332 | A1* | 3/2018 | Chen | H04W 72/23 |
| 2018/0199309 | A1* | 7/2018 | Islam | H04B 7/0619 |
| 2019/0021058 | A1* | 1/2019 | Cheng | H04W 72/23 |
| 2019/0200322 | A1* | 6/2019 | Wang | H04B 7/0695 |
| 2019/0320393 | A1* | 10/2019 | Hosseini | H04W 52/44 |
| 2020/0077362 | A1* | 3/2020 | Liu | H04W 8/24 |
| 2020/0163048 | A1* | 5/2020 | Kim | H04W 72/12 |
| 2020/0275409 | A1* | 8/2020 | Gonzalez | H04W 84/027 |
| 2020/0404617 | A1* | 12/2020 | Murray | H04W 68/02 |
| 2021/0105739 | A1* | 4/2021 | Lin | H04W 68/005 |
| 2021/0127355 | A1* | 4/2021 | Gonzalez | H04W 68/02 |
| 2022/0046582 | A1* | 2/2022 | Shrivastava | H04W 68/02 |
| 2022/0086797 | A1* | 3/2022 | Liu | H04L 5/005 |
| 2022/0124674 | A1* | 4/2022 | Babaei | H04W 68/02 |
| 2022/0159669 | A1* | 5/2022 | Kim | H04W 68/025 |
| 2022/0312367 | A1* | 9/2022 | Xu | H04W 68/005 |
| 2022/0330205 | A1* | 10/2022 | Babaei | H04W 72/23 |
| 2023/0007624 | A1* | 1/2023 | Murray | H04W 68/005 |
| 2023/0189147 | A1* | 6/2023 | Bala | H04W 68/02 |
| | | | | 370/311 |
| 2023/0397112 | A1* | 12/2023 | Sun | H04W 68/00 |

FOREIGN PATENT DOCUMENTS

| | | | |
|---|---|---|---|
| WO | WO-2020071880 A1 * | 4/2020 | |
| WO | WO-2021162927 A1 * | 8/2021 | ............ H04W 24/08 |
| WO | WO-2021204434 A1 * | 10/2021 | |
| WO | WO-2022021285 A1 * | 2/2022 | ............ H04L 5/0051 |
| WO | WO-2022043267 A1 * | 3/2022 | |
| WO | WO-2022081834 A1 * | 4/2022 | |

OTHER PUBLICATIONS

3GPP (VIVO: "Discussion on paging enhancements for idle/inactive mode UE power saving", R1-2005388, Aug. 8, 2020) (Year: 2020).*

Agiwal, M.; Jin, H. Directional Paging for 5G Communications Based on Partitioned User ID. Sensors 2018, 18, 1845. https://doi.org/10.3390/s18061845 (Year: 2018).*

3GPP (VIVO: "Discussion on paging enhancements for idle/inactive mode UE power saving", R1-2005388, Aug. 8, 2020) (Year: 2020) (Year: 2020).*

International Search Report and Written Opinion—PCT/US2021/071927—ISA/EPO—dated Feb. 2, 2022.

VIVO: "Discussion on Paging Enhancements for Idle/Inactive Mode UE Power Saving", 3GPP Draft, 3GPP TSG RAN WG1#102-e, R1-2005388, 3rd Generation Partnership Project (3GPP), Mobile Competence Centre, 650, Route Des Lucioles, F-06921 Sophia-Antipolis Cedex, FR, vol. RAN WG1, No. e-Mtg. Aug. 17, 2020-Aug. 28, 2020,Aug. 8, 2020 (Aug. 8, 2020),XP051917413, 8 Pgs, Retrieved from Internet: URL:https://ftp.3gpp.org/tsg_ran/WG1_RL1/TSGR1_102-e/Docs/R1-2005388.zip. R1-2005388 Potential Paging Enhancements.docx. [Retrieved Aug. 8, 2020], Secs 2.2-3.2.

* cited by examiner

PAGE INDICATION FOR IDLE OR INACTIVE STATE USER EQUIPMENT (UE)

CROSS-REFERENCE TO RELATED APPLICATIONS

The present application for patent claims the benefit of U.S. Provisional Application No. 63/094,077, entitled "PAGE INDICATION FOR IDLE OR INACTIVE USER EQUIPMENT (UE)," filed Oct. 20, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving, from a base station, before a next paging occasion (PO) of a paging cycle, a page indication (PI) in a first PI location associated with the next PO, wherein the PI comprises at least one repetition of a plurality of repetitions of the PI transmitted in the first PI location on each of a plurality of beams; and decoding the PI to determine whether or not the UE is paged in the next PO.

In an aspect, a user equipment (UE) includes a memory; at least one transceiver; and at least one processor communicatively coupled to the memory and the at least one transceiver, the at least one processor configured to: receive, via the at least one transceiver, from a base station, before a next paging occasion (PO) of a paging cycle, a page indication (PI) in a first PI location associated with the next PO, wherein the PI comprises at least one repetition of a plurality of repetitions of the PI transmitted in the first PI location on each of a plurality of beams; and decode the PI to determine whether or not the UE is paged in the next PO.

In an aspect, a user equipment (UE) includes means for receiving, from a base station, before a next paging occasion (PO) of a paging cycle, a page indication (PI) in a first PI location associated with the next PO, wherein the PI comprises at least one repetition of a plurality of repetitions of the PI transmitted in the first PI location on each of a plurality of beams; and means for decoding the PI to determine whether or not the UE is paged in the next PO.

In an aspect, a non-transitory computer-readable medium stores computer-executable instructions that, when executed by a user equipment (UE), cause the UE to: receive, from a base station, before a next paging occasion (PO) of a paging cycle, a page indication (PI) in a first PI location associated with the next PO, wherein the PI comprises at least one repetition of a plurality of repetitions of the PI transmitted in the first PI location on each of a plurality of beams; and decode the PI to determine whether or not the UE is paged in the next PO.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
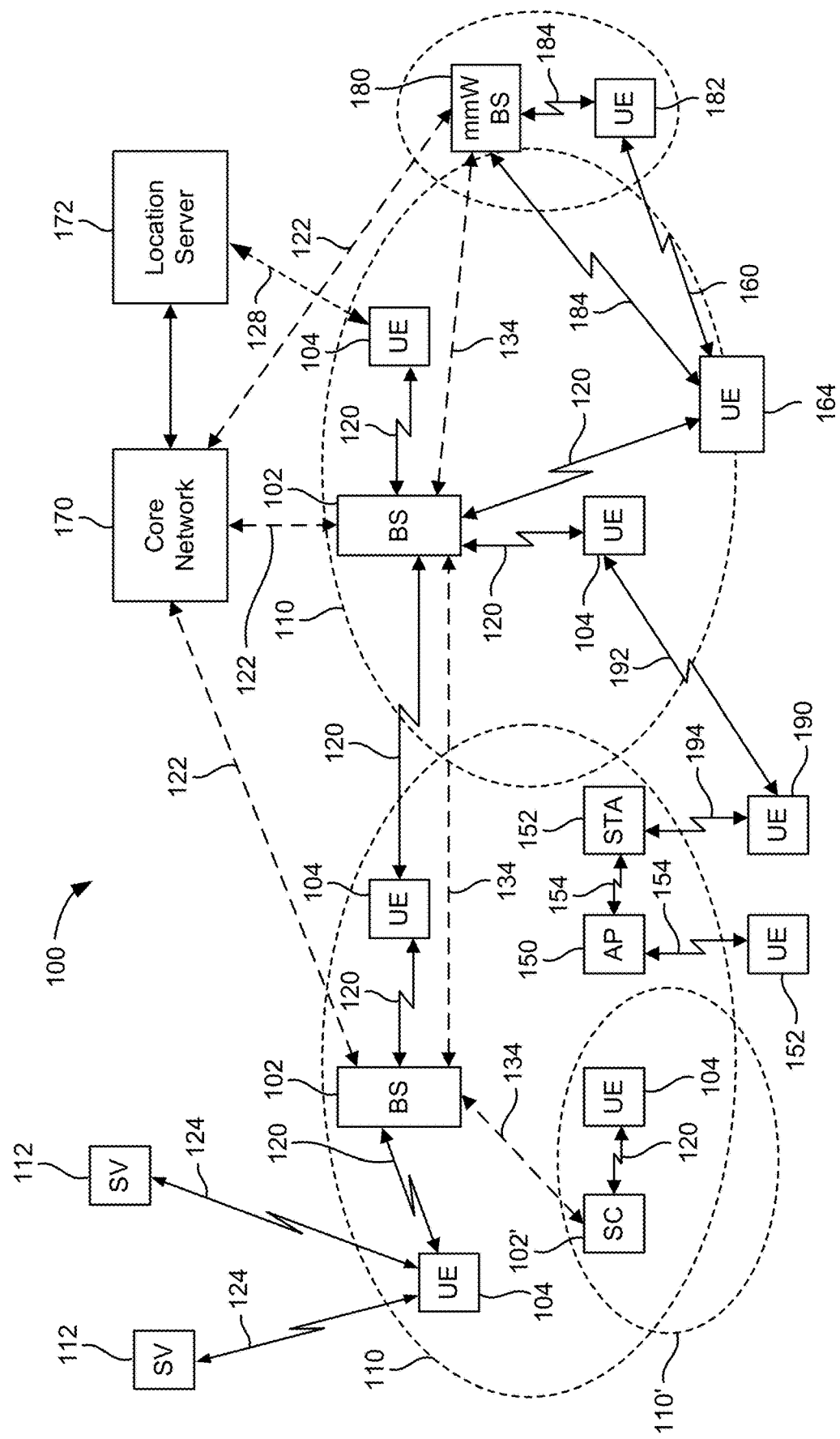
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
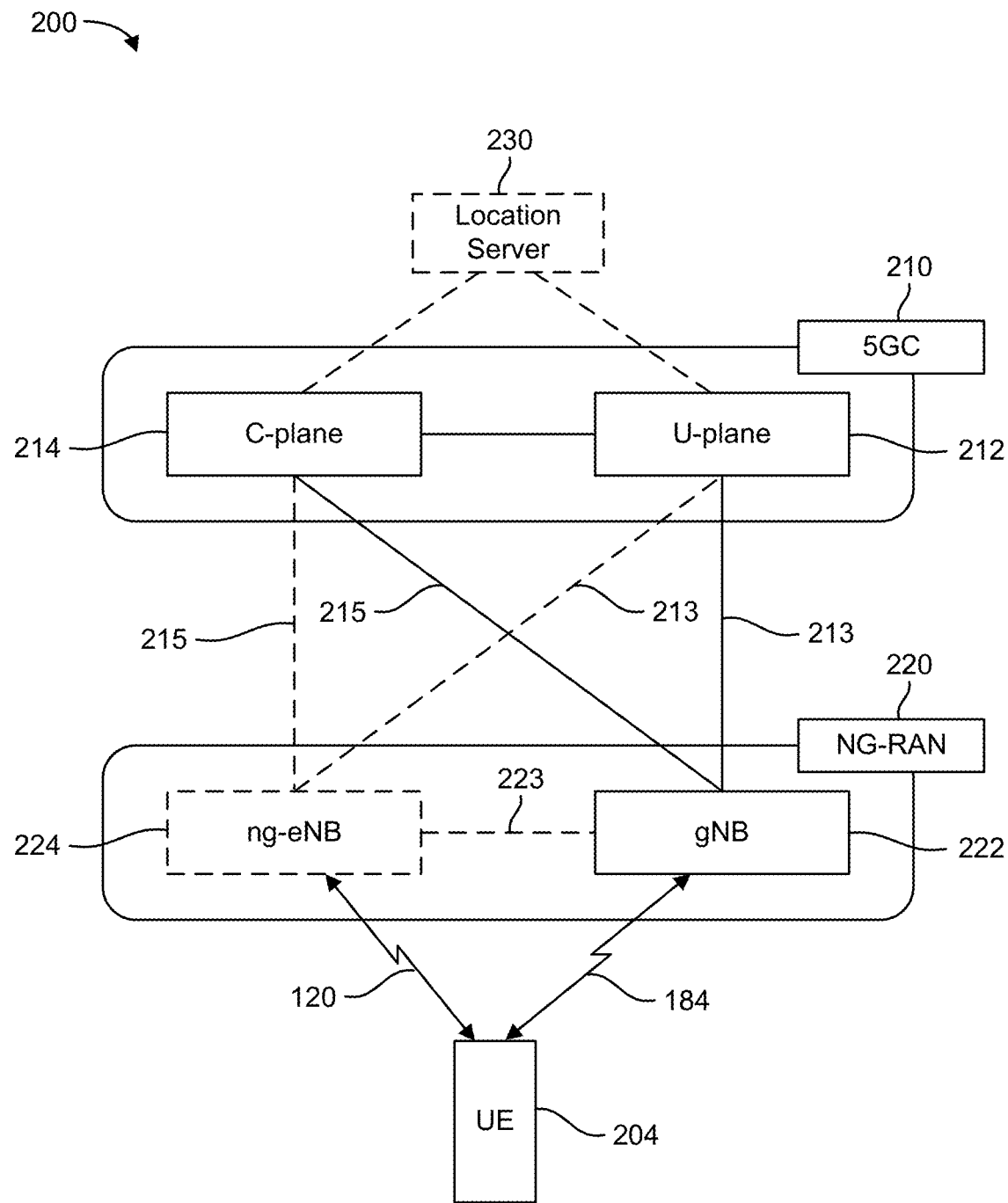
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
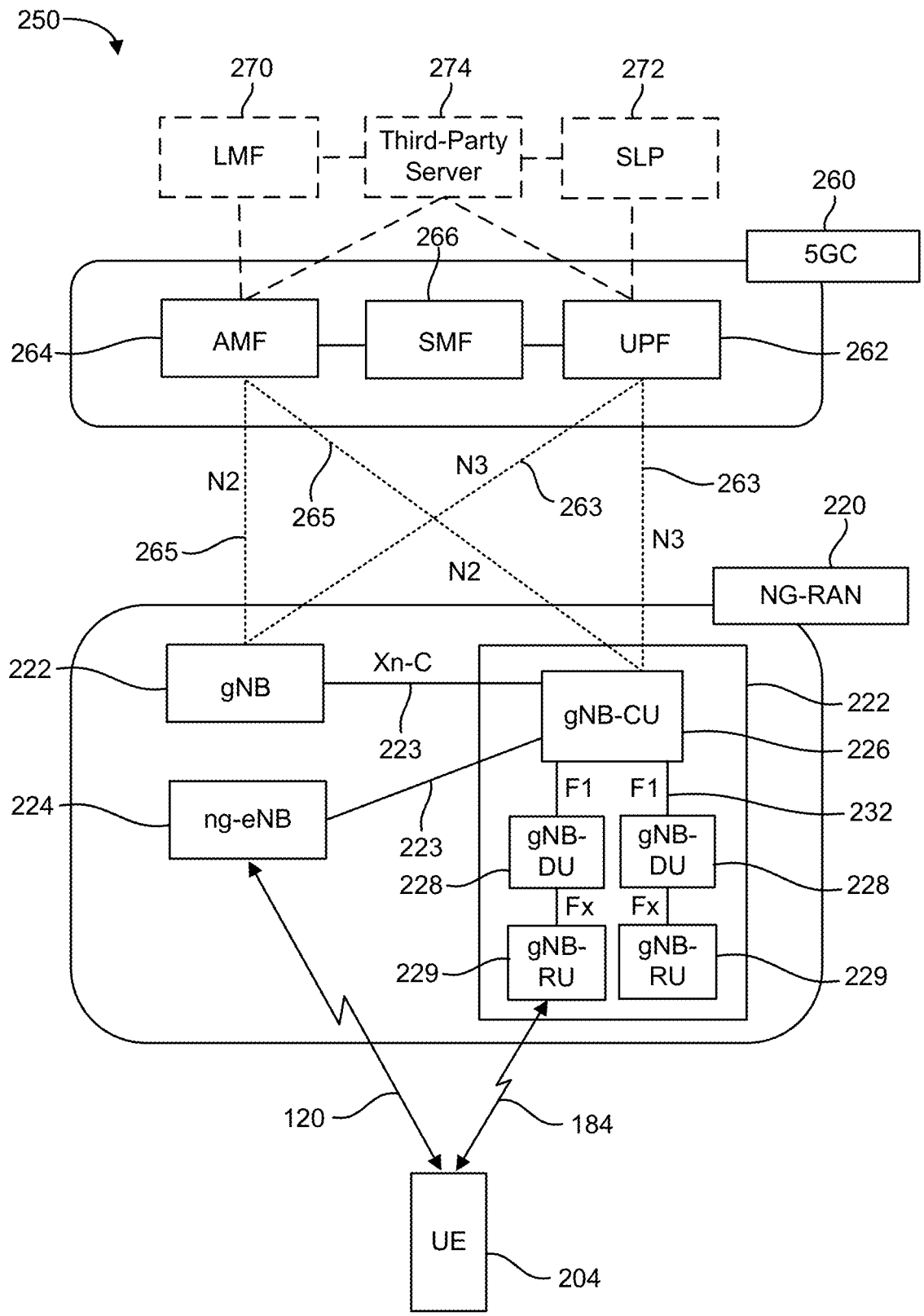

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
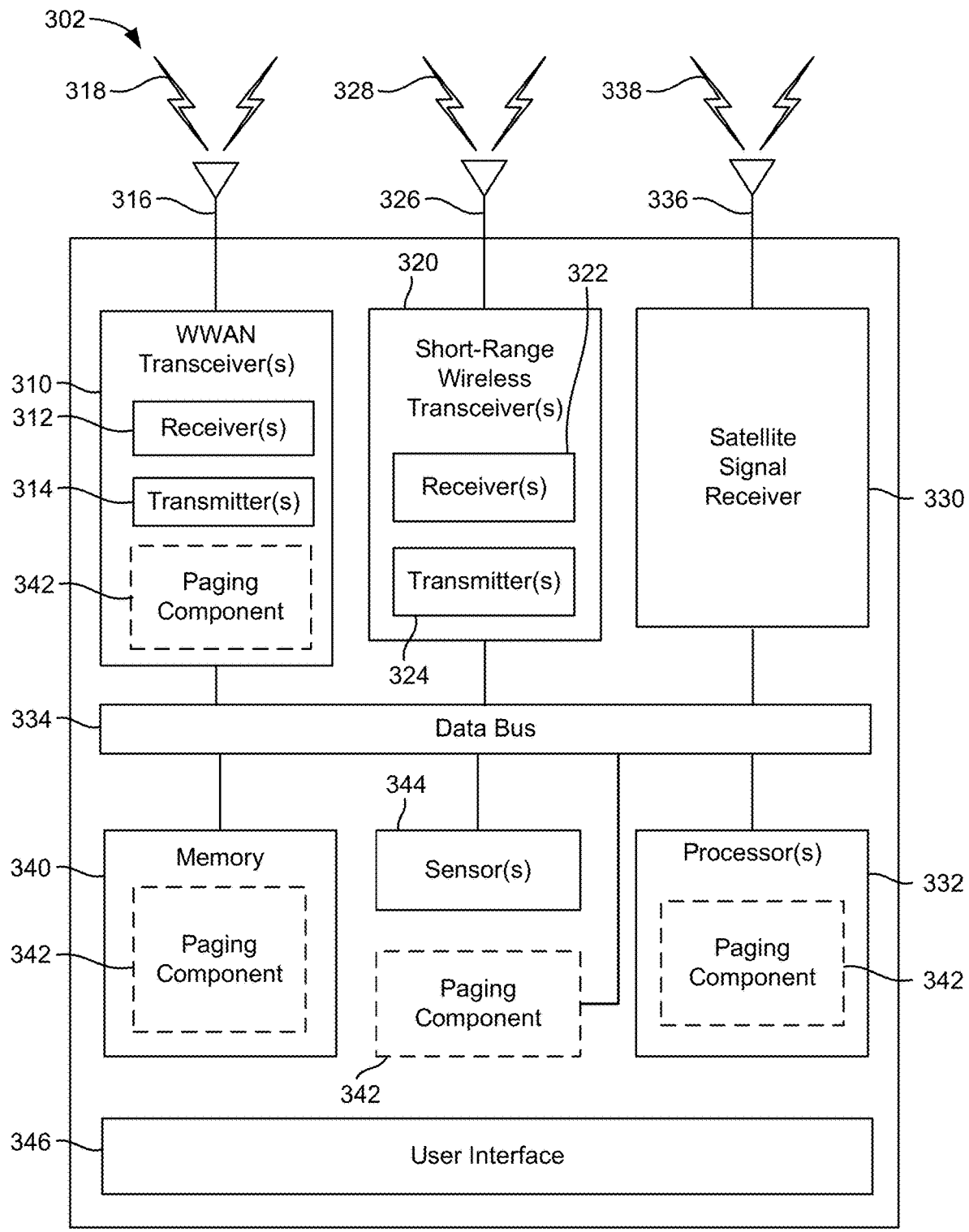
FIGS. 3A, 3B, and 3C are simplified block diagrams of several sample aspects of components that may be employed in a user equipment (UE), abase station, and a network entity, respectively, and configured to support communications as taught herein.
Figure 3B:
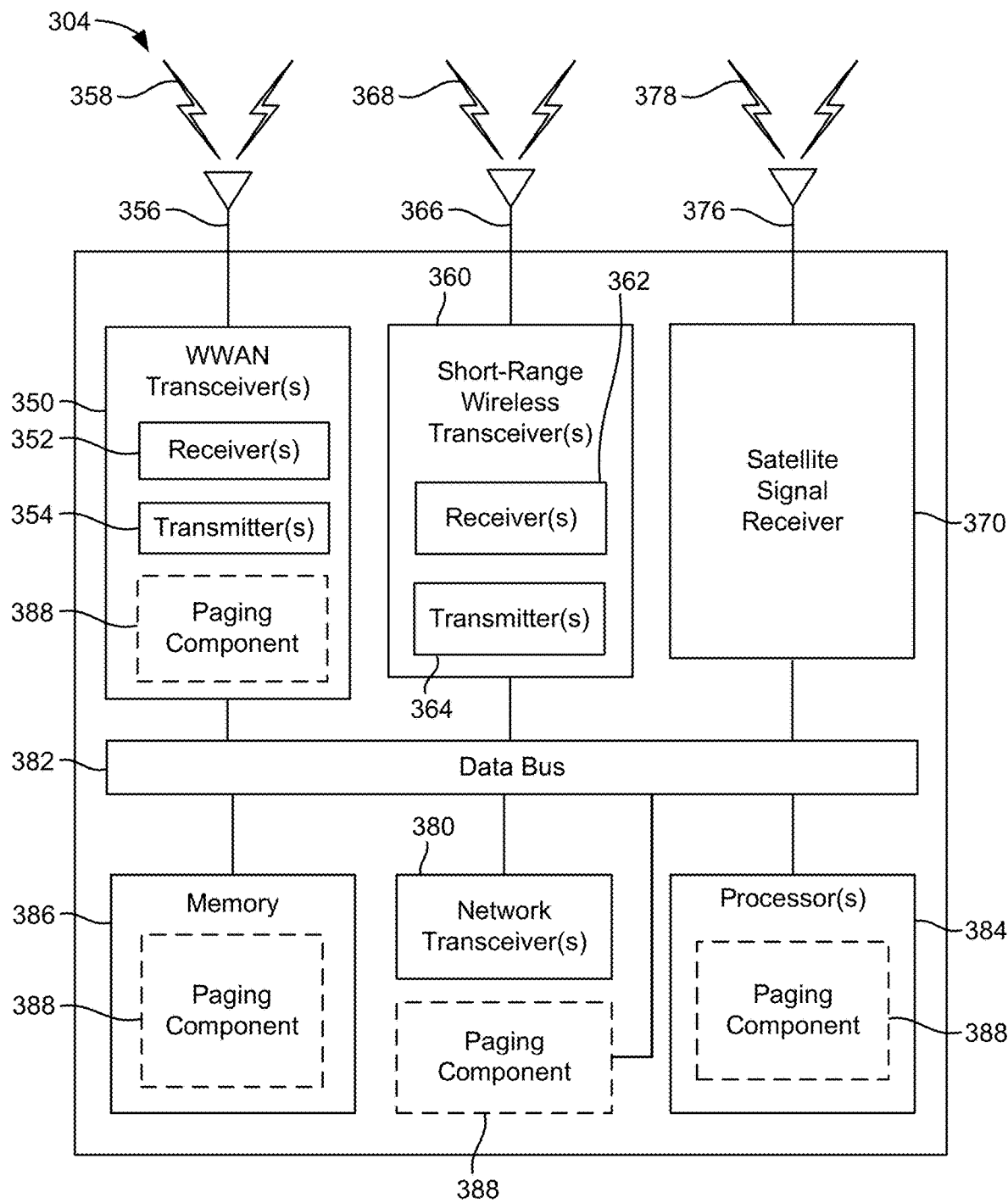
Figure 3C:
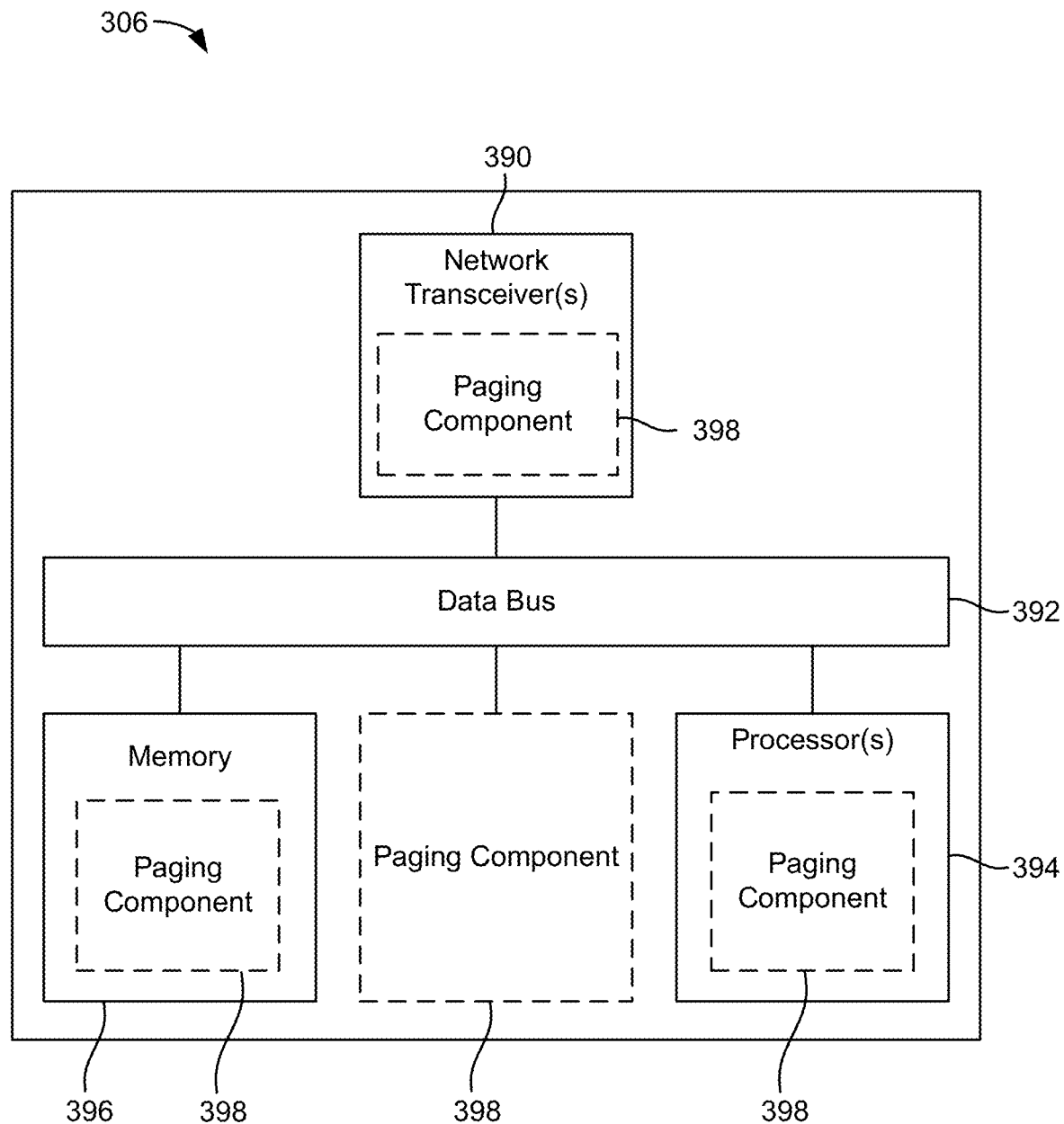

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include paging component 342, 388, and 398, respectively. The paging component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the paging component 342, 388, and 398 may be external to the processors 332, 384, and 394 (e.g., part of a modem processing system, integrated with another processing system, etc.). Alternatively, the paging component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the paging component 342, which may be, for example, part of the one or more WWAN transceivers 310, the memory 340, the one or more processors 332, or any combination thereof, or may be a standalone component. FIG. 3B illustrates possible locations of the paging component 388, which may be, for example, part of the one or more WWAN transceivers 350, the memory 386, the one or more processors 384, or any combination thereof, or may be a standalone component. FIG. 3C illustrates possible locations of the paging component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the paging component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4A:
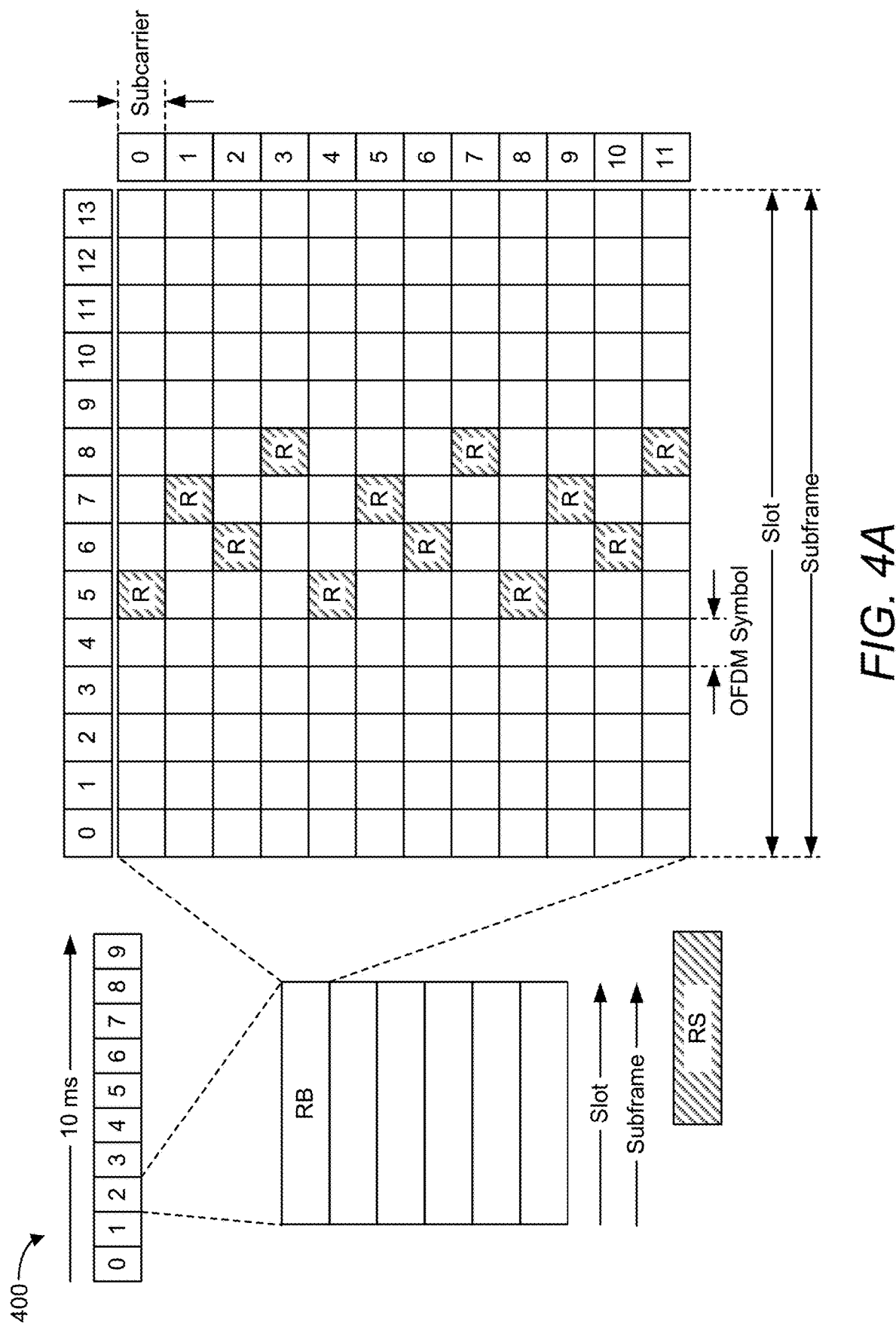
FIG. 4A is a diagram illustrating an example frame structure, according to aspects of the disclosure.

Various frame structures may be used to support downlink and uplink transmissions between network nodes (e.g., base stations and UEs). FIG. 4A is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (p), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4A, a numerology of 15 kHz is used. Thus, in the time domain, a 10 ms frame is divided into 10 equally sized subframes of 1 ms each, and each subframe includes one time slot. In FIG. 4A, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4A, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4A illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,'

PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4A); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 4B:
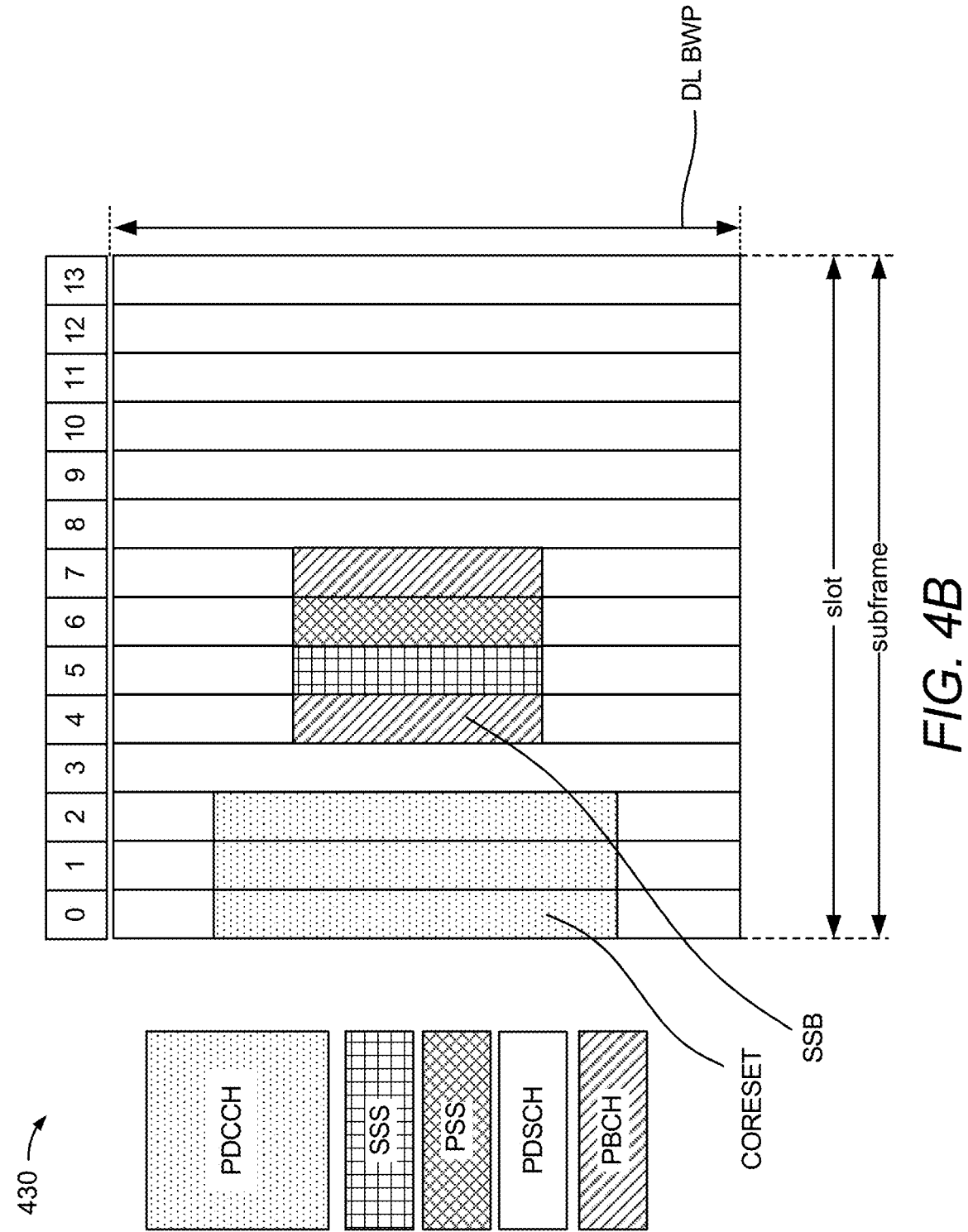
FIG. 4B is a diagram illustrating various downlink channels within an example downlink slot, according to aspects of the disclosure.

FIG. 4B is a diagram 430 illustrating various downlink channels within an example downlink slot. In FIG. 4B, time is represented horizontally (on the X axis) with time increasing from left to right, while frequency is represented vertically (on the Y axis) with frequency increasing (or decreasing) from bottom to top. In the example of FIG. 4B, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

After a random access procedure, the UE is in an RRC CONNECTED state. The RRC protocol is used on the air interface between a UE and abase station. The major functions of the RRC protocol include connection establishment and release functions, broadcast of system information, radio bearer establishment, reconfiguration, and release, RRC connection mobility procedures, paging notification and release, and outer loop power control. In LTE, a UE may be in one of two RRC states (CONNECTED or IDLE), but in NR, a UE may be in one of three RRC states (CONNECTED, IDLE, or INACTIVE). The different RRC states have different radio resources associated with them that the UE can use when it is in a given state. Note that the different RRC states are often capitalized, as above; however, this is not necessary, and these states can also be written in lowercase.

Figure 5:
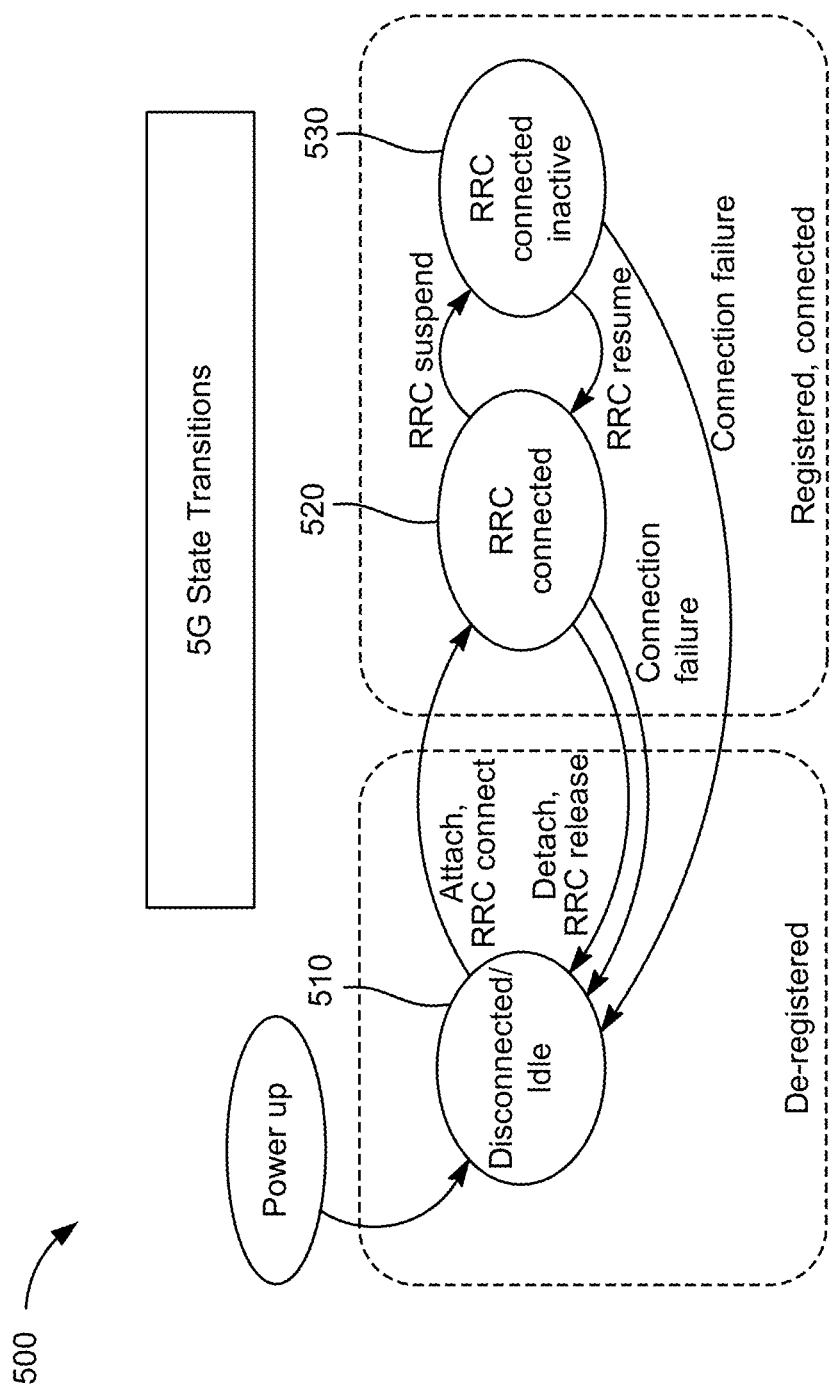
FIG. 5 illustrates the different radio resource control (RRC) states in NR, according to aspects of the disclosure.

FIG. 5 is a diagram 500 of the different RRC states (also referred to as RRC modes) available in NR, according to aspects of the disclosure. When a UE is powered up, it is initially in the RRC DISCONNECTED/IDLE state 510. After a random access procedure, it moves to the RRC CONNECTED state 520. If there is no activity at the UE for a short time, it can suspend its session by moving to the RRC INACTIVE state 530. The UE can resume its session by performing a random access procedure to transition back to the RRC CONNECTED state 520. Thus, the UE needs to perform a random access procedure to transition to the RRC CONNECTED state 520, regardless of whether the UE is in the RRC IDLE state 510 or the RRC INACTIVE state 530.

The operations performed in the RRC IDLE state 510 include public land mobile network (PLMN) selection, broadcast of system information, cell re-selection mobility, paging for mobile terminated data (initiated and managed by the 5GC), discontinuous reception (DRX) for core network paging (configured by non-access stratum (NAS)). The operations performed in the RRC CONNECTED state 520 include 5GC (e.g., 5GC 260) and NG-RAN (e.g., NG-RAN 220) connection establishment (both control and user planes), UE context storage at the NG-RAN and the UE, NG-RAN knowledge of the cell to which the UE belongs, transfer of unicast data to/from the UE, and network controlled mobility. The operations performed in the RRC INACTIVE state 530 include the broadcast of system information, cell re-selection for mobility, paging (initiated by the NG-RAN), RAN-based notification area (RNA) management (by the NG-RAN), DRX for RAN paging (configured by the NG-RAN), 5GC and NG-RAN connection establishment for the UE (both control and user planes), storage of the UE context in the NG-RAN and the UE, and NG-RAN knowledge of the RNA to which the UE belongs.

Even when there is no traffic being transmitted from the network to a UE, the UE is expected to monitor every downlink subframe on the physical downlink control channel (PDCCH). This means that the UE has to be "on," or active, all the time, even when there is no traffic, since the UE does not know exactly when the network will transmit data for it. However, being active all the time is a significant power drain for a UE.

To address this issue, a UE may implement discontinuous reception (DRX) and/or connected-mode discontinuous reception (CDRX) techniques. DRX and CDRX are mechanisms in which a UE goes into a "sleep" mode for a scheduled periods of time and "wakes up" for other periods of time. During the wake, or active, periods, the UE checks to see if there is any data coming from the network, and if there is not, goes back into sleep mode.

To implement DRX and CDRX, the UE and the network need to be synchronized. In a worst-case scenario, the network may attempt to send some data to the UE while the UE is in sleep mode, and the UE may wake up when there is no data to be received. To prevent such scenarios, the UE and the network should have a well-defined agreement about when the UE can be in sleep mode and when the UE should be awake/active. This agreement has been standardized in various technical specifications. Note that DRX includes CDRX, and thus, references to DRX refer to both DRX and CDRX, unless otherwise indicated.

The network (e.g., serving cell) can configure the UE with the DRX/CDRX timing using an RRC Connection Reconfiguration message (for CDRX) or an RRC Connection Setup message (for DRX). The network can signal the following DRX configuration parameters to the UE. (1) DRX Cycle: The duration of one 'ON time' plus one 'OFF time.' This value is not explicitly specified in RRC messages; rather, it is calculated by the subframe/slot time and "long DRX cycle start offset." (2) ON Duration Timer: The duration of 'ON time' within one DRX cycle. (3) DRX Inactivity Timer: How long a UE should remain 'ON' after the reception of a PDCCH. When this timer is on, the UE remains in the 'ON state,' which may extend the ON period into the period that would be the 'OFF' period otherwise. (4) DRX Retransmission Timer: The maximum number of consecutive PDCCH subframes/slots a UE should remain active to wait for an incoming retransmission after the first available retransmission time. (5) Short DRX Cycle: A DRX cycle that can be implemented within the 'OFF' period of a long DRX cycle. (6) DRX Short Cycle Timer: The consecutive number of subframes/slots that should follow the short DRX cycle after the DRX inactivity timer has expired.

Figure 6A:
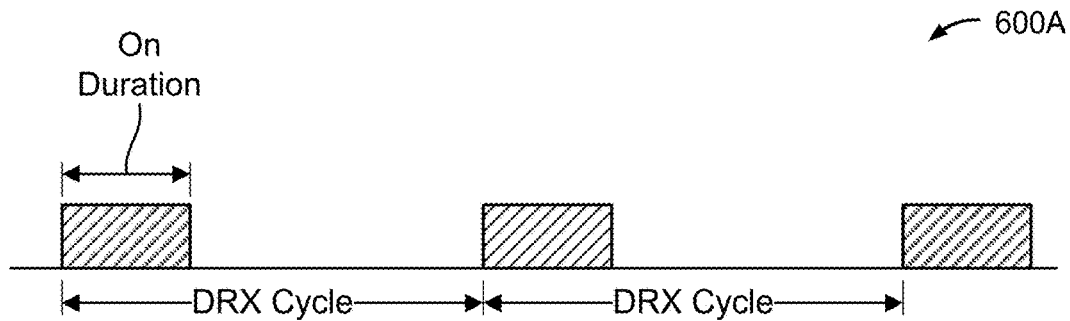
FIGS. 6A to 6C illustrate example discontinuous reception (DRX) configurations, according to aspects of the disclosure.
Figure 6B:
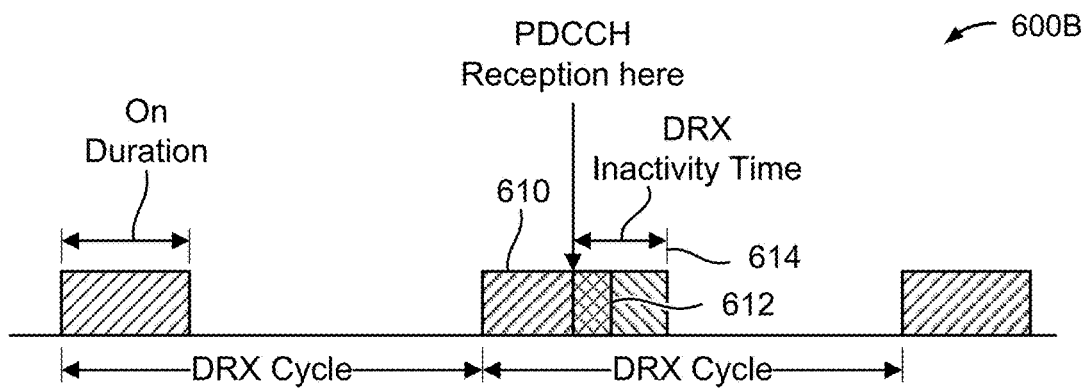
Figure 6C:
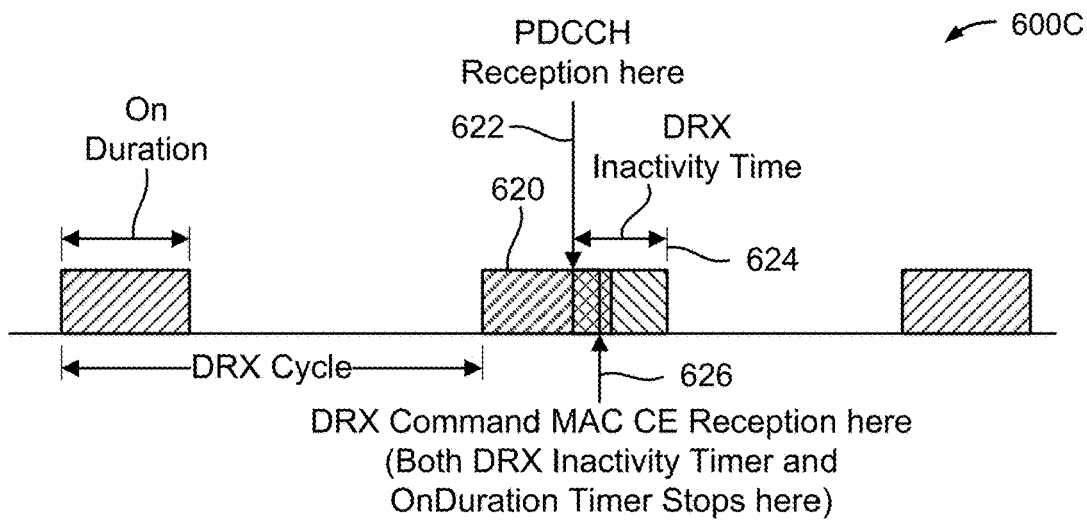

FIGS. 6A to 6C illustrate example DRX configurations, according to aspects of the disclosure. FIG. 6A illustrates an example DRX configuration 600A in which a long DRX cycle (the time from the start of one ON duration to the start of the next ON duration) is configured and no PDCCH is received during the cycle. FIG. 6B illustrates an example DRX configuration 600B in which a long DRX cycle is configured and a PDCCH is received during an ON duration 610 of the second DRX cycle illustrated. Note that the ON duration 610 ends at time 612. However, the time that the UE is awake/active (the "active time") is extended to time 614 based on the length of the DRX inactivity timer and the time at which the PDCCH is received. Specifically, when the PDCCH is received, the UE starts the DRX inactivity timer and stays in the active state until the expiration of that timer (which is reset each time a PDCCH is received during the active time).

FIG. 6C illustrates an example DRX configuration 600C in which a long DRX cycle is configured and a PDCCH and a DRX command MAC control element (MAC-CE) are received during an ON duration 620 of the second DRX cycle illustrated. Note that the active time beginning during ON duration 620 would normally end at time 624 due to the reception of the PDCCH at time 622 and the subsequent expiration of the DRX inactivity timer at time 624, as discussed above with reference to FIG. 6B. However, in the example of FIG. 6C, the active time is shortened to time 626 based on the time at which the DRX command MAC-CE, which instructs the UE to terminate the DRX inactivity timer and the ON duration timer, is received.

In greater detail, the active time of a DRX cycle is the time during which the UE is considered to be monitoring the PDCCH. The active time may include the time during which the ON duration timer is running, the DRX inactivity timer is running, the DRX retransmission timer is running, the MAC contention resolution timer is running, a scheduling request has been sent on the PUCCH and is pending, an uplink grant for a pending HARQ retransmission can occur and there is data in the corresponding HARQ buffer, or a PDCCH indicating a new transmission addressed to the cell radio network temporary identifier (C-RNTI) of the UE has not been received after successful reception of a random access response (RAR) for the preamble not selected by the UE. And, in non-contention-based random access, after receiving the RAR, the UE should be in an active state until the PDCCH indicating new transmission addressed to the C-RNTI of the UE is received.

Paging is the mechanism whereby the network informs the UE that it has data for the UE. In most cases, the paging process occurs while the UE is in the radio resource control (RRC) IDLE state or RRC INACTIVE state. This means that the UE needs to monitor whether the network is transmitting any paging message to it. For example, during the IDLE state, the UE enters the sleep mode defined in its discontinuous reception (DRX) cycle. The UE periodically wakes up and monitors its paging frame (PF) and paging occasion (PO) within that PF on the physical downlink control channel (PDCCH) to check for the presence of a paging message. The PF and PO indicate the time period (e.g., one or more symbols, slots, subframes, etc.) during which the RAN (e.g., serving base station/TRP/cell) will transmit any pages to the UE, and therefore, the time period during which the UE should monitor for pages. The PF and PO are configured to occur periodically, specifically, at least once during each DRX cycle (which is equal to the paging cycle). Although both the PF and PO are needed to determine the time at which to monitor for pages, for simplicity, often only the PO is referenced. If the PDCCH, via the PF and PO, indicates that a paging message is transmitted in the subframe, then the UE needs to demodulate the paging channel (PCH) on the physical downlink shared channel (PDSCH) to see if the paging message is directed to it.

The PDCCH and PDSCH are transmitted using beam sweeping and repetition. For beam sweeping, within each PO, the paging PDCCH and PDSCH are transmitted on all synchronization signal block (SSB) beams for SSBs transmitted in the cell. This is because when the UE is in the RRC IDLE state or RRC INACTIVE state, the base station does not know where in its geographic coverage area the UE is located, and therefore, needs to beamform over its entire geographic coverage area (i.e., on all of its transmit beams). For repetition, the paging PDCCH and PDSCH can be transmitted multiple times on each beam within the PO. Therefore, each PO contains multiple consecutive paging PDCCH monitoring occasions (PMOs).

Legacy UE's are expected to monitor all POs in their paging cycle (typically one PO per paging cycle per UE). In NR, however, the network (e.g., serving base station) can transmit a page indication (PI) to a UE during a monitoring occasion ahead of a PO. The PI (also referred to as a "paging early indication" or "PEI") indicates whether the UE is paged in the upcoming PO. Specifically, if the PI indicates that the UE is not paged, the UE does not need to decode the paging PDCCH and PDSCH. Only if the PI indicates that the UE is paged does the UE continue to decode the paging PDCCH and PDSCH.

There are different options for the design of the PI. As a first option, the PI may be based on the paging PDCCH with cross-slot scheduling. As a second option, the PI may use a dedicated PDCCH. That is, a dedicated portion of the PDCCH may carry the PI, and if present, may indicate that the UE is paged, or there may be different indications for the UE being paged or not paged. As a third option, the PI may be a specific reference signal (or sequence) (referred to as RS-based). In that case, the presence of the reference signal may indicate that the UE is paged, or different sequences encoded as the reference signal may indicate that the UE is either paged or not paged.

Figure 7:
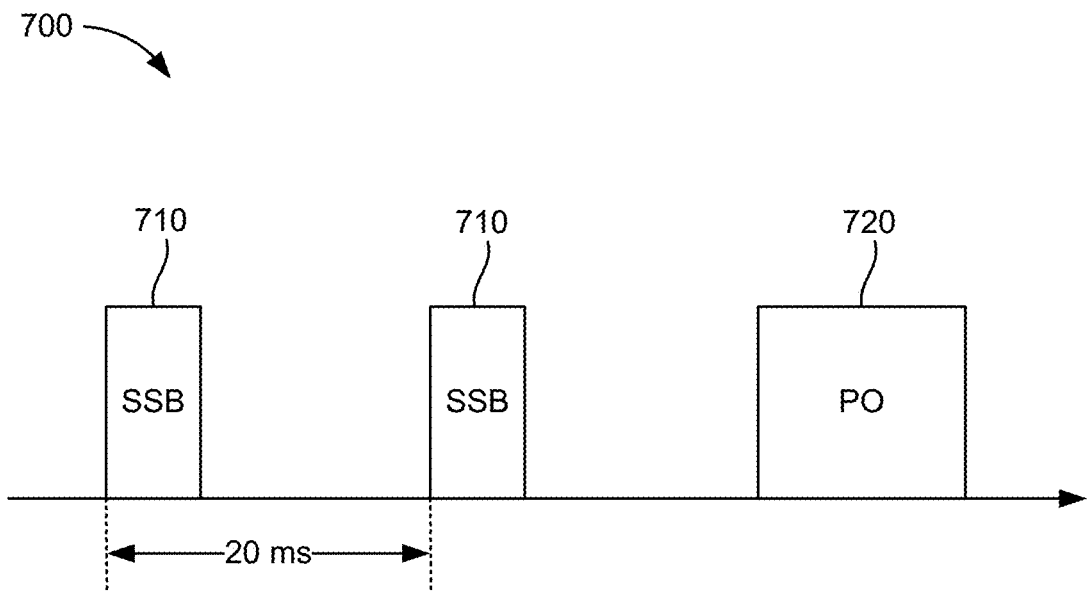
FIG. 7 illustrates an example scenario in which a page indication (PI) can provide power savings, according to aspects of the disclosure.
Figure 7:
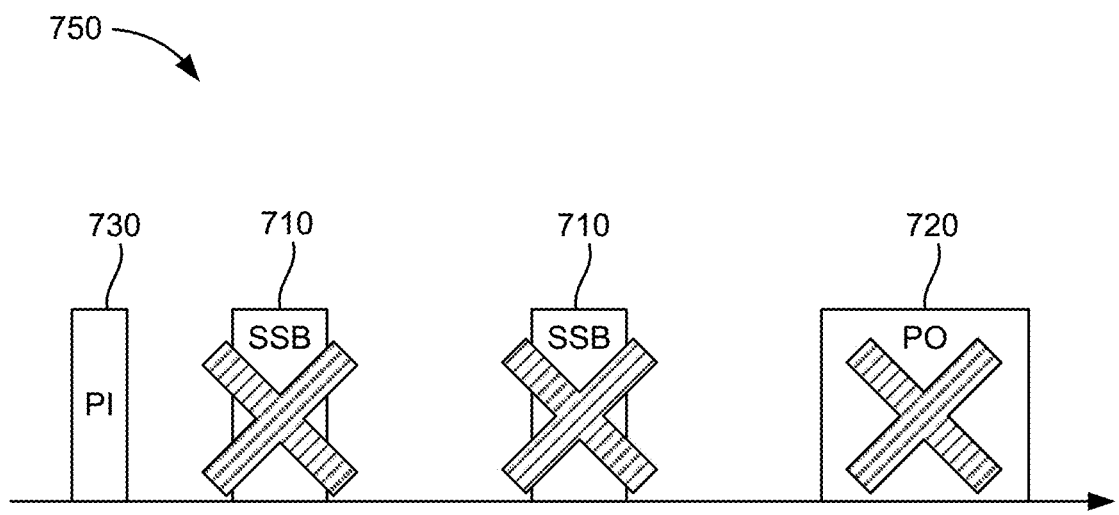

As will be appreciated, using a PI provides a power savings gain for idle and inactive UEs. For example, the PI can provide power savings since the UE can skip the processing of the SSBs and/or reference signals that are needed for decoding the paging PDSCH if the PI indicates that the UE is not paged in the upcoming PO. An example is shown in FIG. 7. This is beneficial because the PDSCH has a higher requirement than the PDCCH for time/frequency tracking loop updates and automatic gain control (AGC) accuracy. Further, if the UE is not paged, as indicated by the PI or the lack of PI, the UE does not need to decode the paging PDCCH and PDSCH, further reducing power consumption.

FIG. 7 illustrates an example scenario in which a PI can provide power savings, according to aspects of the disclosure. In FIG. 7, time is represented horizontally. A first diagram 700 illustrates two SSB occasions 710 (with a periodicity of 20 ms) followed by a PO 720. In this example, the UE is not configured with reference signals (which would be in place of or in addition to the SSB occasions 710), so only the SSB occasions 710 are used for tracking loops and AGC. In this example, even though the UE is not paged in the PO 720, because there is no PI, the UE is still expected to process all SSB occasions 710 and the PO 720 as if it is paged.

A second diagram 750 illustrates the same two SSB occasions 710 followed by a PO 720. In this example, however, there is a PI 730 before the first SSB occasion 710. Once the UE decodes the PI 730 it knows that it is not paged in the subsequent PO 720 and can skip the SSB occasions 710, as well as skipping the PO 720 (as indicated by the "Xs"). Note that although FIG. 7 illustrates SSB occasions 710, the SSB occasions 710 may instead be reference signal occasions used for the same purpose (e.g., tracking loops and AGC).

Regarding the SSB or reference signal occasions that the UE processes before a PO, the UE processes SSBs and/or reference signals before a PO to refine its tracking loops (e.g., time/frequency, AGC). The number of SSB and/or reference signal occasions the UE needs to process for a PO depends on various factors. One factor is whether the UE is paged and the PDSCH is scheduled by the paging PDCCH. If the PDSCH is not scheduled, at most one SSB and/or reference signal occasion may be enough. If the PDSCH is scheduled, more than one SSB and/or reference signal occasion may be needed depending on the SINR of the channel. Another factor is the SINR condition. For high or moderate SINR values, at most one SSB and/or reference signal occasion may be needed. For lower SINR values, however, more than one SSB and/or reference signal occasion may be needed.

Figure 8:
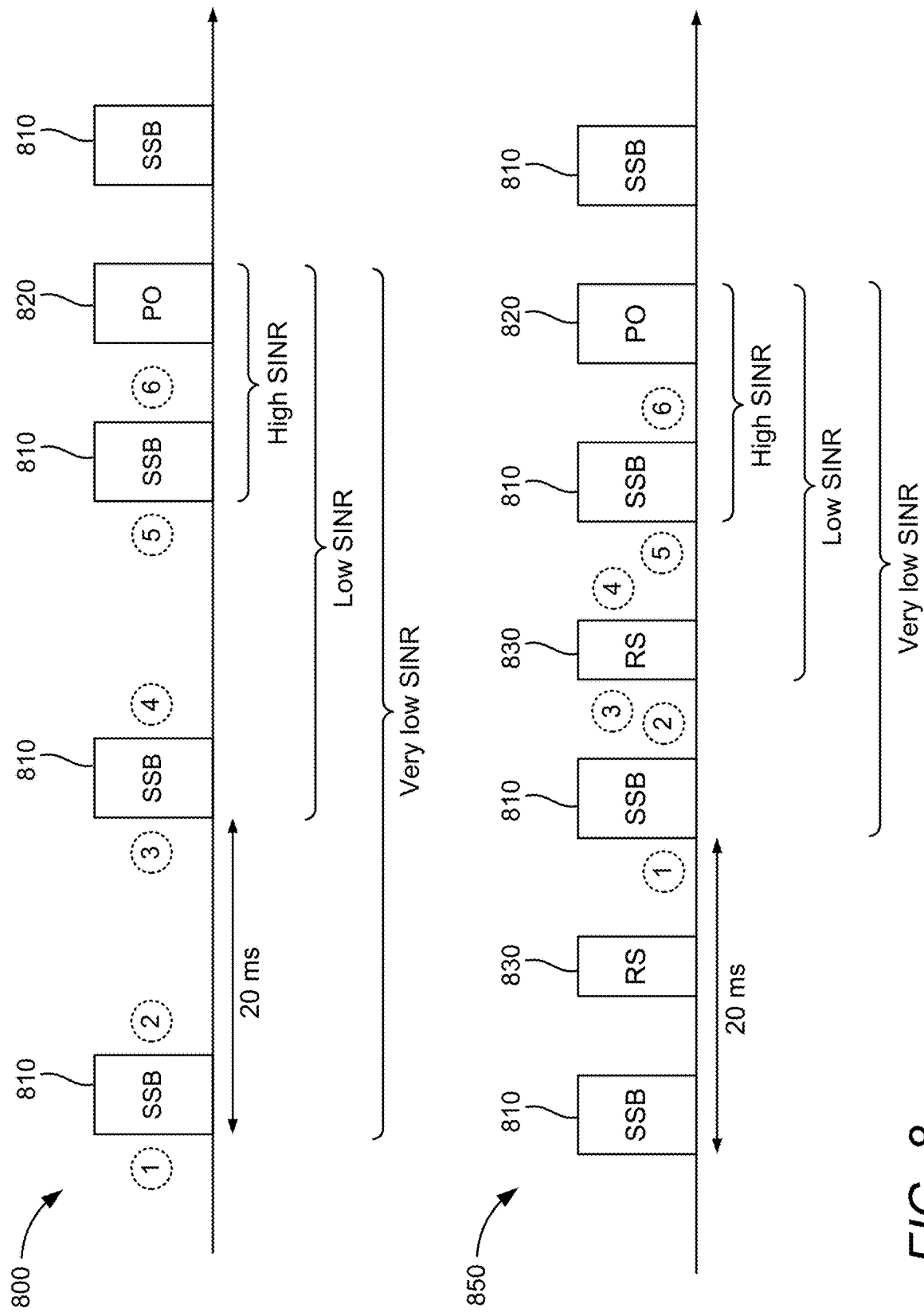
FIG. 8 illustrates possible locations of PIs, according to aspects of the disclosure.

FIG. 8 illustrates possible locations of PIs, according to aspects of the disclosure. In FIG. 8, time is represented horizontally. A first diagram 800 is an example of multiple SSB occasions 810 and a PO 820 but no reference signal occasions. A second diagram 850 is an example of multiple SSB occasions 810 interleaved with multiple reference signal (RS) occasions 830. The reference signal occasions 830 may be CSI-RS or TRS occasions, for example. In diagram 850, the SSB occasions 810 and the reference signal occasions 830 are uniformly distributed. In both diagrams 800 and 850, the periodicity of both the SSB occasions 810 and the reference signal occasions 830 is 20 ms (although the disclosure is not limited to this example).

The brackets in both diagrams indicate the occasions that a UE should process before and including the PO 820 if it is paged. Thus, in diagram 800, for a high SINR, the UE only needs to process the SSB occasion 810 preceding the PO 820. For a low SINR, the UE needs to process the two SSB occasions 810 preceding the PO 820. For a very low SINR, the UE needs to process the three SSB occasions 810 preceding the PO 820. As will be appreciated, these are merely examples, and the UE may need to process more or fewer SSB occasions 810 preceding a PO 820 depending on the SINR of the channel.

In diagram 850, the UE needs to process the same number of occasions preceding a PO 820. However, because the SSB occasions 810 and the reference signal occasions 830 are interleaved, this may include both SSB occasions 810 and reference signal occasions 830, depending on the SINR. Specifically, for a high SINR, the UE only needs to process the SSB occasion 810 preceding the PO 820. For a low SINR, the UE needs to process the reference signal occasion 830 and the SSB occasion 810 preceding the PO 820. For a very low SINR, the UE needs to process the two SSB occasions 810 and on reference signal occasion 830 preceding the PO 820. Again, as will be appreciated, these are merely examples, and the UE may need to process more or fewer SSB occasions 810 and reference signal occasions 830 preceding a PO 820 depending on the SINR of the channel.

The circled numbers before and after the SSB occasions 810 and the reference signal occasions 830 that need to be monitored in each SINR scenario indicate possible locations for a PI for the PO 820. As discussed above, if a PI indicates that the UE is not paged, the UE can skip the SSB occasions 810 and reference signal occasion 830 (all or partially) before a PO 820. Therefore, it would be better to transmit the PI before all of the SSB occasions 810 and reference signal occasions 830 that the UE needs to process for the PO 820 (e.g., location '3' for low SINR). However, for a PDCCH-based PI, the UE may need to process one SSB occasion 810 or reference signal occasion 830 first to refine the tracking loops for the PDCCH decoding, given the relatively higher requirements of a PDCCH-based PI than an RS-based PI. Thus, for a PDCCH-based PI, the preferred location may be after the first SSB occasion 810 or reference signal occasion 830 to be processed before a PO 820 (e.g., location '4' for low SINR).

It should be noted that each SSB occasion 810 or reference signal occasion 830 may contain multiple SSBs or reference signals due to beam sweeping and repetition of the SSB or reference signal. This is to guarantee that, for all beams on which the paging PDCCH and PDSCH are transmitted, there are SSBs and/or reference signals the UE can use to track the time/frequency offsets and channel gain of the PDCCH and PDSCH.

With continued reference to the possible locations of PIs, for idle or inactive UEs, there is normally no uplink transmission from the UE to the base station. Because of that, the SINR condition of the UE is unknown to the base station (i.e., it cannot measure the SINR of the channel between the base station and the UE based on uplink signaling from the UE), and therefore, the base station cannot set the location of the PI based on the SINR of the channel. One option is to assume a certain SINR condition (e.g., low SINR). Another option is to transmit PI at multiple locations to cover all SINR conditions. In addition, for different implementations, the optimal PI location can also be different.

A first proposal described herein relates to the location of the PI. Specifically, the present disclosure provides various options for the PI location before the next PO. As a first option, the PI may be transmitted at a single location for each PO during the paging cycle. In this option, the various SINR conditions and implementations need to be taken into account. As a second option, the PI may be transmitted at multiple locations for each PO during the paging cycle. In this option, the UE can choose its preferred PI locations based on its implementation and SINR condition of the channel. As shown in FIG. 8, each PI location can be associated with an SSB occasion or a reference signal occasion (e.g., location '5' is associated with the SSB occasion 810 immediately preceding the PO 820). These options apply to both PDCCH-based and RS-based PI, but the optimal PI location may be different for PDCCH-based and RS-based due, for example, to different time/frequency and/or gain tracking accuracy requirements for receiving these different PIs.

A second proposal described herein relates to beam sweeping and repetition of PI. Specifically, for each PI location (e.g., as illustrated in FIG. 8), PI can be transmitted with beam sweeping and repetition, similar to the beam sweeping and repetition for the paging PDCCH and PDSCH. With respect to beam sweeping, within each PI location, the PI may be transmitted on all beams of the cell. The beams may be associated with the SSBs transmitted in the cell (e.g., the PI may be transmitted on the same beams as this SSB). This means that the PI will be quasi co-located with transmitted SSBs. With respect to repetitions, within each PI location, the PI associated with each SSB can be transmitted multiple times. Such repetition provides processing gain. More specifically, in one or more first repetitions, the UE can estimate the gain of the channel during PI transmission, and during one or more subsequent repetitions, the UE can measure and process (decode) the PI. In this proposal, for PDCCH-based PI, beam sweeping and repetition may be applied across consecutive PMOs.

Similarly, for RS-based PI, beam sweeping and repetition may be applied across consecutive reference signal transmissions. More specifically, a single transmission does not include a beam sweep or repetitions; rather, the base station may beam sweep by transmitting a reference signal transmission first on one beam, then on a second beam, then on a third beam, and so on. Thus, each reference signal transmission would correspond to a single beam.

A third proposal described herein relates to the pattern of the beam sweeping and repetition of PI. As a first option, beam sweeping may be applied first across beams, and then the beam sweeping pattern is repeated in time. As a second option, the base station first repeats the PI on one beam and then transmits repetitions of the PI on the next beam, and so on. These options are illustrated in FIG. 9.

Figure 9:
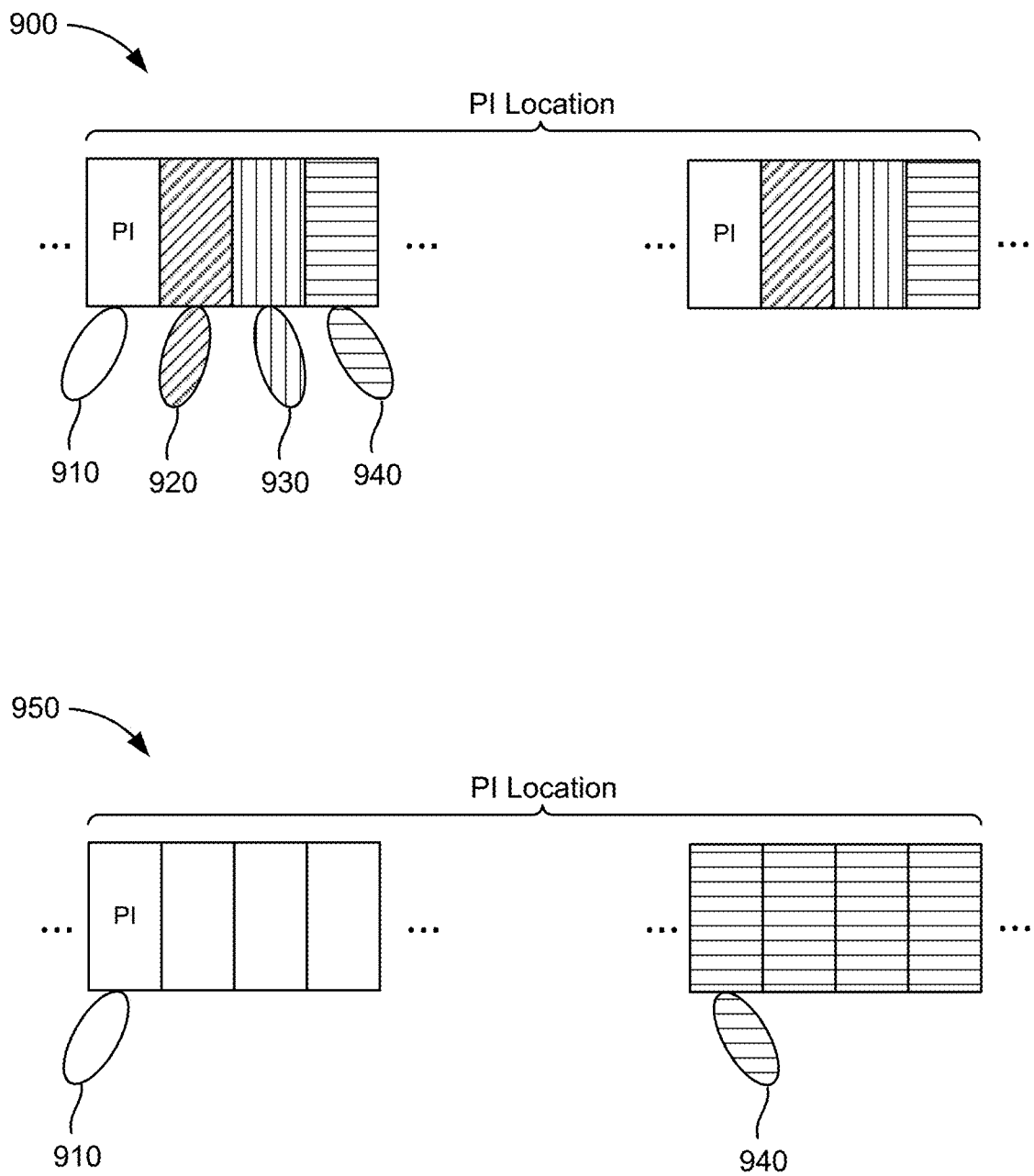
FIG. 9 illustrates examples of beam sweeping patterns for PI, according to aspects of the disclosure.

FIG. 9 illustrates examples of beam sweeping patterns for PI, according to aspects of the disclosure. Diagram 900 illustrates the first option described above and diagram 950 illustrates the second option described above. Both diagrams represent a single PI location (e.g., one of locations '1,' '2,' '3,' etc. in FIG. 8). The base station may transmit four repetitions (indicated by the shaded blocks) of the PI on each of four beams 910, 920, 930, and 940. The repetitions may be within one or more symbols, one or more slots, one or more subframes, etc.

In diagram 900, the base station first beam sweeps the PI across beams 910-940, and then repeats the beam sweeping pattern across time. In that way, there are four repetitions on each beam, but each repetition on a beam is separated in time from the next repetition on that beam by the three repetitions of the PI on the other three beams. In diagram 950, the base station transmits four repetitions of the PI on beam 910, then four repetitions on beam 920 (not shown), then four repetitions on beam 930 (not shown), and then four repetitions on beam 940.

The remaining proposals described herein relate to the design of the PI (e.g., based on the paging PDCCH with cross-slot scheduling, a dedicated PDCCH, or a reference signal). A fourth proposal described herein relates to using the paging PDCCH with cross-slot scheduling as the PI. Cross-slot scheduling means that the PDSCH scheduling offset ($K_0$) is larger than zero. The current maximum configurable $K_0$ value is 32 (in slots). $K_0$ is dynamically indicated by the paging PDCCH based on a set of $K_0$ values defined in the time domain resource allocation (TDRA) table.

Figure 10:
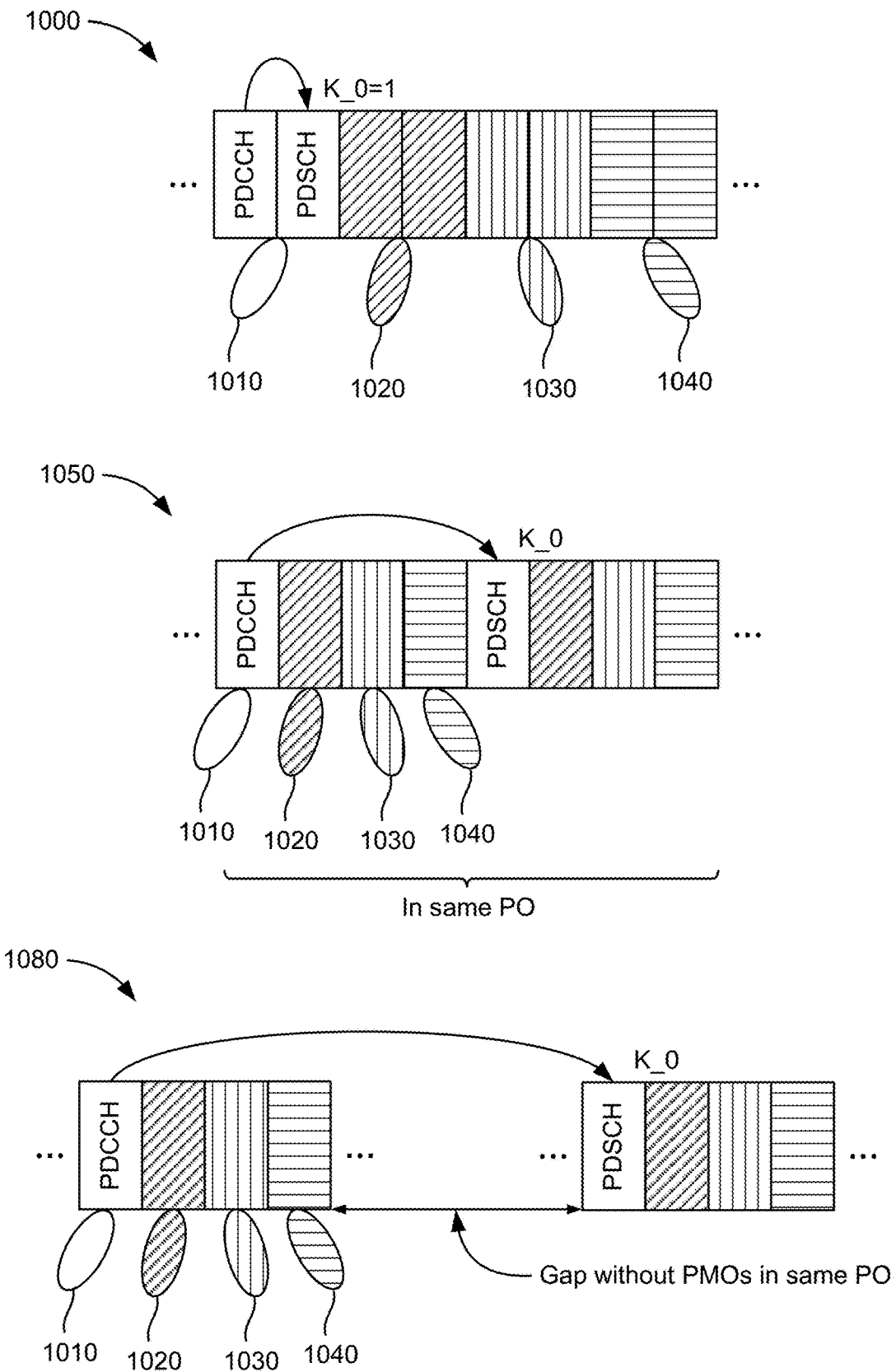
FIG. 10 illustrates various options for using a paging physical downlink control channel (PDCCH) with cross-slot scheduling as a PI, according to aspects of the disclosure.

FIG. 10 illustrates the various options within this proposal. In FIG. 10, time is represented horizontally, and each block represents a slot (but could represent some other unit of time, such as a symbol, a subframe, etc.). Further, the base station may transmit two slots on each of four beams 1010, 1020, 1030, and 1040 (although as will be appreciated, there may be more or fewer slots per beam). The illustrated slots are PMOs of the same PO.

As a first option within this proposal, the base station does not transmits on different beam between the PI PDCCH (i.e., the paging PDCCH acting as a PI) and the scheduled PDSCH. This is illustrated by diagram 1000, where the paging PDCCH and the PDSCH are transmitted on the same beam (beam 1010). In addition, in the example of diagram 1000, the paging PDCCH search space periodicity is two slots, meaning that the PDCCH and PDSCH are transmitted on the same beam in two consecutive slots (and therefore, $K_0=1$).

As a second option, the base station transmits on different beam between the PI PDCCH and the scheduled PDSCH. This is illustrated by diagram 1050, where the paging PDCCH and the PDSCH are transmitted on the same beam (beam 1010), but the UE receives beams 1020, 1030, and 1040 between receiving the PDCCH and the PDSCH on beam 1010. In the example of diagram 1050, the paging PDCCH search space periodicity is one slot. In addition, in this option, the PMOs are for the same PO, and there is no gap without transmitted PMOs of the same PO. That is, the eight slots in diagram 1050 are for the same PO, and there is no gap between any of them (i.e., they are consecutive slots).

As a third option, the PI PDCCH and the scheduled PDSCH are transmitted with a gap where PMOs from the same PO are not transmitted by the base station. This is illustrated by diagram 1080, where the paging PDCCH and the PDSCH are transmitted on the same beam (beam 1010), but there is a gap between the slots of the PMOs of the PO.

With the first option (illustrated by diagram 1000), the UE needs to process all SSBs and/or reference signals needed for decoding the PDSCH before receiving the paging PDCCH. With the third option (illustrated by diagram 1080), the UE can skip any SSBs and/or reference signals after the PI for further power saving (if the UE is not paged). The flexibility and power savings of the second option is between the first and third options.

With continued reference to the fourth proposal, the PDCCH configuration of the PI can still be provided in the RRC configuration parameter "pagingSearchSpace" for a Type-2 PDCCH common search space (CSS) set. The DCI (i.e., PDCCH payload) can provide scheduling information for the paging message PDSCH. Note that a search space is the area in the downlink resource grid (e.g., as illustrated in FIG. 4B) where the PDCCH may be carried. A CSS is the specific search space within which every UE needs to search for the signals for every UE (e.g., PDCCH for SIB) or signaling messages that apply to every UE before a dedicated channel is established for a specific UE (e.g., PDCCH used during RACH process).

As a fifth proposal described herein, PMOs of the PI should not collide with any paging PMOs for legacy UEs (e.g., LTE UEs and UEs compliant with earlier 5G NR releases) associated with different PO indices (i.e., different group of UEs). That is, different groups of UEs may be associated with different PO indices, and PMOs of the PI should not collide with any paging PMOs associated with different PO indices. Otherwise, if there is a collision, UEs associated with different POs will not know which group of UEs is being paged.

As noted above, the current maximum configurable $K_0$ value is 32 slots. However, due to beam sweeping and repetitions, this maximum value may not be enough for cross-carrier scheduling for PI. Accordingly, a sixth proposal disclosed herein extends the value range of the scheduling offset ($K_0$, denoted "K_0" in the figure). As a first option within this proposal, the maximum configurable value of $K_0$ can be increased. As noted above, the set of $K_0$ values is provided in a TDRA table. To avoid impacting legacy UEs, a dedicated TDRA table can be defined for idle or inactive UEs that supports the disclosed paging PDCCH-based PI. For example, the table may include a new default table in the applicable wireless communications standard and a new configurable table provided in cell-specific PDSCH configuration messages (e.g., "PDSCH-configCommon" in SIB1).

As a second option within this proposal, a time offset can be defined. The offset can be configured by network. In this option, the time domain location of a legacy PO can be used as a reference point. For example, the offset may be defined as the distance between the PI PMOs and the legacy PO (e.g., a slot offset between the first PMO of the PI for the PO and the first legacy paging PMO in the same PO). The offset may be added to the value of $K_0$ indicated by the PDCCH PI received in the PI PMOs. If the PI is transmitted at multiple locations (the second option of the first proposal), the offset can be multiplied by a factor n first for the nth PI location before legacy paging PMOs in the PO.

With reference now to a dedicated PDCCH-based PI, a seventh proposal described herein provides for the use of a dedicated PDCCH as the PI for idle or inactive UEs. With respect to the search space set of the PDCCH, if a search space set is dedicatedly configured for PDCCH monitoring for PI for idle or inactive mode UEs, the configuration can be provided in in the parameter "PDCCH-ConfigCommon." This parameter also provides configuration for other search space sets (e.g., paging, SIB1, etc.) available to idle or inactive UEs. With respect to the CORESET for the PI PDCCH, the search space set may be linked to either the common CORESET or CORESET #0 based on the CORESET-Id in the search space set configuration.

An eighth proposal described herein provides options for the search space set design for the dedicated PDCCH-based PI. As a first option, a new search space set can be added to the 3GPP Release 15 (the 3GPP standards version for non-stand-alone mode NR) search space set configuration. As a second option, a new search space set can be added to the 3GPP Release 16 (the 3GPP standards version expanding the NR standard) search space set configuration. As a third option, a search space set from the 3GPP Release 15 search space set configuration (e.g., "pagingSearchSpace," "searchSpaceZero") can be reused for PDCCH-based PI. For example, the aggregation level and number of PDCCH candidates of the PDCCH can reuse the 3GPP Release 15 numbers defined for the paging PDCCH, the scheduling PDCCH for SIB1, and other SIBs. As a fourth option, a search space set from the 3GPP Release 16 search space set configuration (e.g., the search space set for DCI format 2_6 for connected mode UE wakeup PDCCH) can be reused. As a fifth option, a new search space set can be defined for the 3GPP Release 17 (the next phase of NR standards) search space set configuration.

With continued reference to dedicated PDCCH-based PI, a ninth proposal described herein defines what the set of configuration parameters for dedicated PDCCH based PI can include. For example, the set of configuration parameters may include an RNTI for cyclic redundancy check (CRC) scrambling of the DCI of the PDCCH. The set of configuration parameters may further include the offset from the start of the search-time of the PI to the start of the PO (i.e., the first legacy PMO of the PO). The parameters may further include the minimum time gap between the end of the slot for PI monitoring to the start of the PO. The parameters may further include the size of the DCI of the PDCCH. The parameters may further include the number of bits for the indication field for each UE group. If, however, the network does not configure this, a default number of bits (e.g., one) can be used. The parameters may further include a detection flag indicating whether the UE is expected to process the next PO if the PI is not detected. The parameters may further include the repetition factor, which indicates how many PMOs of the PDCCH PI are transmitted on each beam in one PO (e.g., four in the examples of FIG. 9).

With continued reference to dedicated PDCCH-based PI, a tenth proposal described herein defines how the PI configuration can be provided to a UE. For example, the PI configuration may be provided in (1) an "RRCRelease" message, (2) a new RRC message (e.g., within "PDCCH-ConfigCommon"), (3) an existing SIB (e.g., SIB1), or (4) a new SIB. As a fifth option, the PI configuration can be carried by the PDSCH scheduled by the paging PDCCH.

With continued reference to dedicated PDCCH-based PI, in an eleventh proposal described herein, the starting bit of the indication field for the UE group containing the UE within the DCI of the PDCCH PI can be determined by the PO index of the UE being paged, the UE's group index, and the number of bits for each indication field (which may be configured as described above in the ninth proposal). Note that the PO index of the UE being paged is optional. For example, the starting bit of UE group $i_g$ (also denoted i_g) in PO $i_s$ (also denoted i_s) can be determined as $(i_s*N_g+i_g)*N_b$. If the PIs for UEs associated with different POs are separately transmitted in different PDCCHs, the starting bit of UE group $i_g$ in a PO $i_s$ can be determined as $i_g*N_b$. In the foregoing, $N_g$ (also denoted N_g) is the number of UE groups in the same PO and $N_b$ (also denoted N_b) is the number of bits for each indication (which may be configured as described above in the ninth proposal). The number of bits $N_b$ for each indication may have a default value of 1 if not otherwise configured.

In a further aspect of the eleventh proposal, UEs in the same PO can be split into smaller groups to reduce unnecessary false paging reception. False paging means that the UE is not paged, but another UE in the same group of UEs is paged. Thus, by splitting the PO groups into smaller groups, it is less likely that a UE will receive a page that is not intended for it.

Referring now to RS-based PI, a twelfth proposal described herein provides for the use of a sequence or reference signal as a PI. The reference signal can be described as carrying the sequence and the sequence can be described as being configured as a reference signal. As such, the terms can be used interchangeably. The configuration parameters for the reference signal/sequence may be provided by the base station in the RRC parameter "RRCRelease," a new RRC message, an existing SIB, a new SIB, or the PDSCH scheduled by the paging PDCCH. The configuration parameters for the reference signal/sequence may include the offset from the start of the search-time of the sequence or reference signal to the start of the PO, where the start of the PO is the first legacy PMO of the PO. The configuration parameters may further include the minimum time gap between the end of the slot for reception of the reference signal/sequence to the start of the PO. The configuration parameters may further include detection flag that indicates whether the UE is expected to process the PO if the reference signal/sequence is not detected. The configuration parameters may further include the repetition factor, which indicates how many transmissions are transmitted on each beam in one PO (e.g., four in the example of FIG. 9). The configuration parameters may further include the availability of the reference signal/sequence. This may be dynamically indicated by the paging PDCCH or based on a lifetime in the reference signal or sequence configuration.

With continued reference to RS-based PI, in a thirteenth proposal described herein, PI based on a reference signal/sequence may support multiple groups of UEs in the same PO. As a first option, UE group information (e.g., the group index) can be provided in the reference signal/sequence configuration. In this option, the UE monitors the reference signal/sequence associated with its own group to determine whether it is paged.

As a second option, UE group information (e.g., the group index) can be determined by a mapping from the index of the reference signal (which should be unique among all reference signals that are configured as PI) to the UE group index. For example, the reference signal with index $i_{rs}$ (also denoted r_rs) may be mapped to UE group $i_g$ if $\mod(i_{rs}-i_g, N_g)=0$, where $N_g$ is the number of UE groups in the same PO.

With either option, the RS-based PI can be transmitted on multiple SSB beams. In that case, the first option above works without modification. The second option, however, can be optimized such that the index of the reference signal/sequence is first uniquely defined within all reference signal/sequences quasi-co-located with the same SSB, then mapped to the UE group index.

Figure 11:
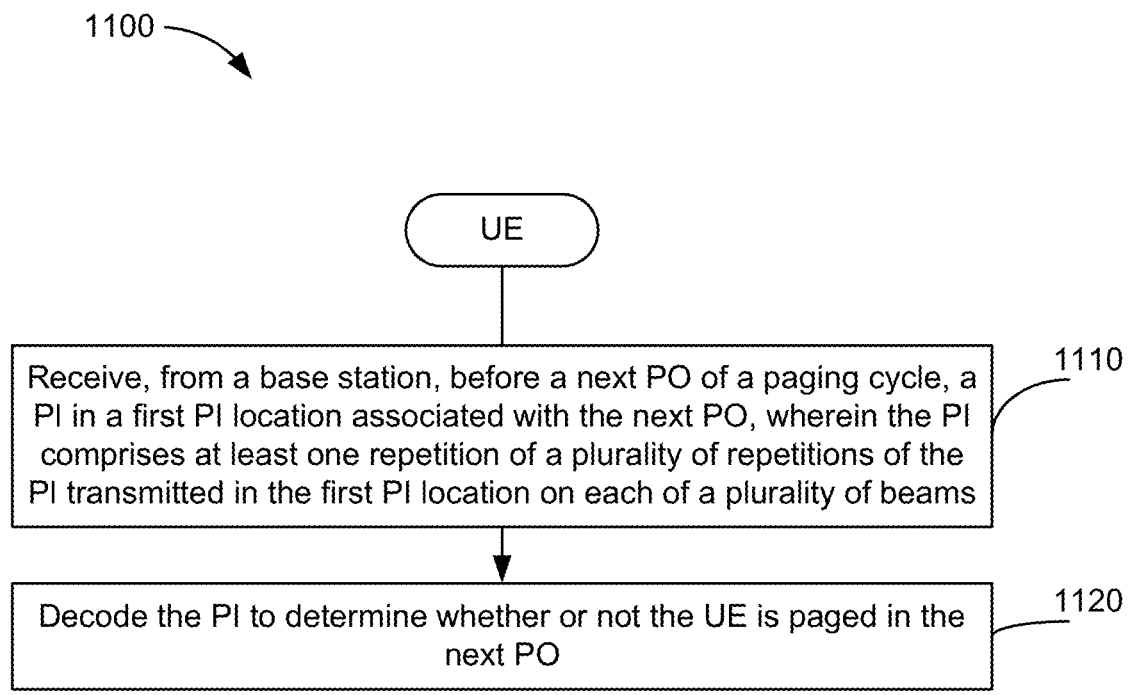
FIG. 11 illustrates an example method of wireless communication, according to aspects of the disclosure.

FIG. 11 illustrates an example method 1100 of wireless positioning, according to aspects of the disclosure. In an aspect, method 1100 may be performed by a UE (e.g., any of the UEs described herein).

At 1110, the UE receives, from a base station (e.g., any of the base stations described herein), before the next PO of a paging cycle, a PI in a first PI location associated with the next PO, wherein the PI comprises at least one repetition of a plurality of repetitions of the PI transmitted in the first PI location on each of a plurality of beams. In an aspect, operation 1120 may be performed by the one or more WWAN transceivers 310, the one or more processors 332, memory 340, and/or paging component 342, any or all of which may be considered means for performing this operation.

At 1120, the UE decodes the PI to determine whether or not the UE is paged in the next PO. In an aspect, operation 1120 may be performed by the one or more WWAN transceivers 310, the one or more processors 332, memory 340, and/or paging component 342, any or all of which may be considered means for performing this operation.

As will be appreciated, a technical advantage of the method 1100 is improved PI signalling for an idle or inactive UE, thereby reducing UE power consumption and signalling overhead, for example.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: receiving, from a base station, before a next paging occasion (PO) of a paging cycle, a page indication (PI) in a first PI location associated with the next PO, wherein the PI comprises at least one repetition of a plurality of repetitions of the PI transmitted in the first PI location on each of a plurality of beams; and decoding the PI to determine whether or not the UE is paged in the next PO.

Clause 2. The method of clause 1, wherein: PIs are transmitted at a single location for the next PO of the paging cycle, and the first PI location is the single location.

Clause 3. The method of clause 2, wherein the single location is before a synchronization signal block (SSB) occasion or a reference signal occasion associated with the next PO.

Clause 4. The method of clause 2, wherein the single location is after an SSB occasion or a reference signal occasion associated with the next PO.

Clause 5. The method of clause 1, wherein PIs are transmitted at multiple locations for the next PO of the paging cycle.

Clause 6. The method of any of clauses 3 to 5, wherein the UE receives the PI in the first PI location based on channel conditions of a channel between the UE and the base station.

Clause 7. The method of clause 6, wherein the channel conditions comprise a signal-to-interference-plus-noise ratio (SINR) of the channel.

Clause 8. The method of any of clauses 1 to 7, wherein each of the plurality of beams is associated with an SSB transmitted by the base station.

Clause 9. The method of any of clauses 1 to 8, wherein each of the plurality of beams is quasi-co-located with an SSB transmitted by the base station.

Clause 10. The method of any of clauses 1 to 9, wherein: the PI comprises a physical downlink control channel (PDCCH)-based PI, and the plurality of beams and the plurality of repetitions are applied across a plurality of consecutive PDCCH monitoring occasions (PMOs).

Clause 11. The method of any of clauses 1 to 9, wherein: the PI comprises a reference signal (RS)-based PI, and the plurality of beams and the plurality of repetitions are applied across a plurality of consecutive reference signal transmissions.

Clause 12. The method of clause 11, wherein each of the plurality of reference signal transmissions comprise a reference signal sequence.

Clause 13. The method of any of clauses 1 to 12, wherein a first repetition of the plurality of repetitions of the PI is transmitted in the first PI location on each of the plurality of beams before a second repetition of the plurality of repetitions of the PI is transmitted in the first PI location on each of the plurality of beams.

Clause 14. The method of any of clauses 1 to 12, wherein all of the plurality of repetitions of the PI are transmitted in the first PI location on a first beam of the plurality of beams before all of the plurality of repetitions of the PI are transmitted in the first PI location on a second beam of the plurality of beams.

Clause 15. The method of any of clauses 1 to 14, wherein the PI comprises a paging PDCCH with cross-slot scheduling to an associated physical downlink shared channel (PDSCH).

Clause 16. The method of clause 15, wherein the base station does not transmit on different beam of the plurality of beam between the paging PDCCH and the associated PDSCH.

Clause 17. The method of clause 15, wherein the base station transmits on different beam of the plurality of beams between the paging PDCCH and the associated PDSCH.

Clause 18. The method of any of clauses 15 to 17, wherein the paging PDCCH and the associated PDSCH are transmitted with a gap where PMOs from the next PO are not transmitted by the base station.

Clause 19. The method of any of clauses 15 to 18, further comprising: receiving, from the base station, a radio resource control (RRC) configuration for the paging PDCCH to act as the PI.

Clause 20. The method of any of clauses 15 to 19, further comprising: receiving, from the base station, downlink control information (DCI) providing scheduling information for the associated PDSCH.

Clause 21. The method of any of clauses 15 to 20, further comprising: receiving, from the base station, a PDSCH scheduling offset $K_0$ indicating a number of slots between the paging PDCCH and the associated PDSCH.

Clause 22. The method of clause 21, wherein the PDSCH scheduling offset $K_0$ is provided in a time domain resource allocation (TDRA) table dedicated for idle or inactive state UEs.

Clause 23. The method of clause 22, wherein a value of the PDSCH scheduling offset $K_0$ is greater than 32 slots.

Clause 24. The method of any of clauses 22 to 23, wherein: the TDRA table comprises a default TDRA table and a configurable TDRA table, the default TDRA table is specified in a wireless communications standard, and the configurable TDRA table is provided in a cell-specific PDSCH configuration message.

Clause 25. The method of any of clauses 15 to 24, further comprising: receiving, from the base station, a time offset indicating a number of slots between the paging PDCCH and the associated PDSCH.

Clause 26. The method of clause 25, wherein the time offset is added to a time domain reference point.

Clause 27. The method of clause 26, wherein the time domain reference point comprises a PDSCH scheduling offset $K_0$.

Clause 28. The method of clause 27, wherein, based on the PI being transmitted at multiple locations, a factor n is multiplied to the time offset for an nth PI location before legacy PMOs in the next PO.

Clause 29. The method of any of clauses 26 to 28, wherein the time domain reference point comprises a starting slot of a next PO for legacy PMOs.

Clause 30. The method of any of clauses 1 to 29, wherein PMOs of the PI are scheduled to not collide with any PMOs for legacy UEs associated with different PO indices.

Clause 31. The method of any of clauses 1 to 30, wherein the PI comprises a dedicated PDCCH.

Clause 32. The method of clause 31, wherein a search space set is defined for the dedicated PDCCH.

Clause 33. The method of clause 32, wherein the search space set comprises: a search space set in a 3GPP Release 15 search space set configuration, a search space set in a 3GPP Release 16 search space set configuration, or a search space set in a 3GPP Release 17 search space set configuration.

Clause 34. The method of clause 33, wherein the search space set in the 3GPP Release 15 search space set configuration comprises: a "pagingSearchSpace" search space set, or a "searchSpaceZero" search space set.

Clause 35. The method of any of clauses 33 to 34, wherein the search space set in the 3GPP Release 16 search space set configuration comprises: a search space set for DCI format 2_6 for a connected mode UE wakeup PDCCH.

Clause 36. The method of any of clauses 31 to 35, further comprising: receiving, from the base station, a set of configuration parameters for the dedicated PDCCH.

Clause 37. The method of clause 36, wherein the set of configuration parameters comprise: a radio network temporary identifier (RNTI) for cyclic redundancy check (CRC) scrambling of DCI for the dedicated PDCCH, an offset from a start of a search time of the dedicated PDCCH to a start of the next PO, a minimum time gap between an end of a slot for dedicated PDCCH monitoring to a start of the next PO, a size of the DCI of the dedicated PDCCH, a number of bits for an indication field for each of a plurality of UE groups, a detection flag indicating whether the UE is expected to process the next PO if the dedicated PDCCH is not detected, a repetition factor indicating how many PMOs of the dedicated PDCCH are transmitted on each of the plurality of beams for the next PO, or any combination thereof.

Clause 38. The method of clause 37, wherein a starting bit of the indication field is determined based on a PO index of the UE, a UE group index, a number of bits for each indication field, or any combination thereof.

Clause 39. The method of clause 38, wherein the starting bit of a UE group $i_g$ in a PO $i_s$ is determined as $(i_s*N_g+i_g)*N_b$, where $N_g$ is a number of UE groups in the same PO and $N_b$ is a number of bits for each indication field.

Clause 40. The method of any of clauses 38 to 39, wherein, based on PIs for UEs associated with different POs being separately transmitted in different PDCCHs, the starting bit of a UE group $i_g$ in a PO $i_s$ is $i_g*N_b$, where $N_g$ is a number of UE groups in the same PO and $N_b$ is a number of bits for each indication field.

Clause 41. The method of any of clauses 28 to 40, wherein the set of configuration parameters are received in: an RRC release message, an RRC message within a "PDCCH-ConfigCommon" information element, a system information block (SIB), a SIB type 1 (SIB1), or a PDSCH scheduled by a paging PDCCH.

Clause 42. The method of any of clauses 1 to 41, wherein the PI comprises a reference signal or a sequence.

Clause 43. The method of clause 42, wherein a configuration of the reference signal or sequence is received in: an RRC release message, an RRC message within a "PDCCH-ConfigCommon" information element, a system information block (SIB), a SIB type 1 (SIB1), or a PDSCH scheduled by a paging PDCCH.

Clause 44. The method of any of clauses 42 to 43, further comprising: receiving, from the base station, a set of configuration parameters for the reference signal or sequence.

Clause 45. The method of clause 44, wherein the set of configuration parameters comprise: an offset from a start of a search time of the reference signal or sequence to a start of the next PO, a minimum time gap between an end of a slot of the reference signal or sequence to a start of the next PO, a detection flag indicating whether the UE is expected to process the next PO if the reference signal or sequence is not detected, a repetition factor indicating how many transmissions of the reference signal or sequence are transmitted on each beam of the plurality of beams in the next PO, an availability of the reference signal or sequence, or any combination thereof.

Clause 46. The method of any of clauses 42 to 45, further comprising: receiving, from the base station, UE group information in a set of configuration parameters for the reference signal or sequence.

Clause 47. The method of any of clauses 42 to 46, further comprising: determining UE group information for the UE based on a mapping from an index of the reference signal or sequence to a UE group index for the UE group information.

Clause 48. The method of any of clauses 38 to 47, wherein a reference signal or sequence with index $i_{rs}$ is mapped to UE group $i_g$ if $\mod(i_{rs}-i_g, N_g)=0$, where $N_g$ is a number of UE groups in the next PO.

Clause 49. The method of any of clauses 42 to 48, wherein: the reference signal or sequence is transmitted by the base station on a plurality of SSB beams, and each repetition of the reference signal or sequence is quasi-co-located with an SSB transmitted by the base station.

Clause 50. The method of any of clauses 1 to 49, further comprising: based on the PI indicating that the UE is paged in the next PO, waking up to receive a page in the next PO.

Clause 51. The method of any of clauses 1 to 50, further comprising: based on the PI indicating that the UE is not paged in the next PO, ignoring the next PO.

Clause 52. The method of any of clauses 1 to 51, wherein the UE is in an RRC idle state or an RRC inactive state.

Clause 53. An apparatus comprising a memory, a transceiver, and a processor communicatively coupled to the memory and the transceiver, the memory, the transceiver, and the processor configured to perform a method according to any of clauses 1 to 52.

Clause 54. An apparatus comprising means for performing a method according to any of clauses 1 to 52.

Clause 55. A non-transitory computer-readable medium storing computer-executable instructions, the computer-executable comprising at least one instruction for causing a computer or processor to perform a method according to any of clauses 1 to 52.

Additional implementation examples are described in the following numbered clauses:

Clause 1. A method of wireless communication performed by a user equipment (UE), comprising: receiving, from a base station, before a next paging occasion (PO) of a paging cycle, a page indication (PI) in a first PI location associated with the next PO, wherein the PI comprises at least one repetition of a plurality of repetitions of the PI transmitted in the first PI location on each of a plurality of beams; and decoding the PI to determine whether or not the UE is paged in the next PO.

Clause 2. The method of clause 1, wherein: PIs are transmitted at a single location for the next PO of the paging cycle, and the first PI location is the single location.

Clause 3. The method of clause 2, wherein: the single location is before a synchronization signal block (SSB) occasion or a reference signal occasion associated with the next PO, or the single location is after the SSB occasion or the reference signal occasion associated with the next PO.

Clause 4. The method of any of clauses 1 to 3, wherein PIs are transmitted at multiple locations for the next PO of the paging cycle.

Clause 5. The method of any of clauses 1 to 4, wherein the PI is received in the first PI location based on channel conditions of a channel between the UE and the base station.

Clause 6. The method of any of clauses 1 to 5, wherein: each of the plurality of beams is associated with an SSB transmitted by the base station, each of the plurality of beams is quasi-co-located with an SSB transmitted by the base station, or any combination thereof.

Clause 7. The method of any of clauses 1 to 6, wherein: the PI comprises a physical downlink control channel (PDCCH)-based PI, and the plurality of beams and the plurality of repetitions are applied across a plurality of consecutive PDCCH monitoring occasions (PMOs).

Clause 8. The method of any of clauses 1 to 7, wherein: the PI comprises a reference signal (RS)-based PI, the plurality of beams and the plurality of repetitions are applied across a plurality of consecutive reference signal transmissions, and each of the plurality of reference signal transmissions comprise a reference signal sequence.

Clause 9. The method of any of clauses 1 to 8, wherein a first repetition of the plurality of repetitions of the PI is transmitted in the first PI location on each of the plurality of beams before a second repetition of the plurality of repetitions of the PI is transmitted in the first PI location on each of the plurality of beams.

Clause 10. The method of any of clauses 1 to 9, wherein all of the plurality of repetitions of the PI are transmitted in the first PI location on a first beam of the plurality of beams before all of the plurality of repetitions of the PI are transmitted in the first PI location on a second beam of the plurality of beams.

Clause 11. The method of any of clauses 1 to 10, wherein: the PI comprises a paging PDCCH with cross-slot scheduling to an associated physical downlink shared channel (PDSCH), the base station does not transmit on different beams of the plurality of beams between the paging PDCCH and the associated PDSCH, the base station transmits on different beams of the plurality of beams between the paging PDCCH and the associated PDSCH, or the paging PDCCH and the associated PDSCH are transmitted with a gap where PMOs from the next PO are not transmitted by the base station.

Clause 12. The method of any of clauses 1 to 11, wherein: the PI comprises a paging PDCCH with cross-slot scheduling to an associated PDSCH, and the method further comprises: receiving, from the base station, a radio resource control (RRC) configuration for the paging PDCCH to act as the PI.

Clause 13. The method of any of clauses 1 to 12, wherein: the PI comprises a paging PDCCH with cross-slot scheduling to an associated PDSCH, and the method further comprises: receiving, from the base station, downlink control information (DCI) providing scheduling information for the associated PDSCH.

Clause 14. The method of any of clauses 1 to 13, wherein: the PI comprises a paging PDCCH with cross-slot scheduling to an associated PDSCH, and the method further comprises: receiving, from the base station, a PDSCH scheduling offset K_0 indicating a number of slots between the paging PDCCH and the associated PDSCH, wherein: the PDSCH scheduling offset K_0 is provided in a time domain resource allocation (TDRA) table dedicated for idle or inactive state UEs, a value of the PDSCH scheduling offset K_0 is greater than 32 slots, the TDRA table comprises a default TDRA table and a configurable TDRA table, the default TDRA table is specified in a wireless communications standard, and the configurable TDRA table is provided in a cell-specific PDSCH configuration message.

Clause 15. The method of any of clauses 1 to 14, wherein: the PI comprises a paging PDCCH with cross-slot scheduling to an associated PDSCH, and the method further comprises: receiving, from the base station, a time offset indicating a number of slots between the paging PDCCH and the associated PDSCH, wherein: the time offset is added to a time domain reference point, the time domain reference point comprises a PDSCH scheduling offset K_0, based on the PI being transmitted at multiple locations, a factor n is multiplied to the time offset for an n-th PI location before legacy PMOs in the next PO, the time domain reference point comprises a starting slot of a next PO for legacy PMOs.

Clause 16. The method of any of clauses 1 to 15, wherein PMOs of the PI are scheduled to not collide with any PMOs for legacy UEs associated with different PO indices.

Clause 17. The method of any of clauses 1 to 16, wherein: the PI comprises a dedicated PDCCH, a search space set is defined for the dedicated PDCCH, and a search space set configuration for the search space set comprises: a Third Generation Partnership Project (3GPP) Release 15 search space set configuration, a 3GPP Release 16 search space set configuration, or a 3GPP Release 17 search space set configuration.

Clause 18. The method of clause 17, wherein the search space set is linked to a common control resource set (CORESET) or a CORESET #0 based on a CORESET identifier in the search space set configuration.

Clause 19. The method of any of clauses 17 to 18, wherein: the search space set in the 3GPP Release 15 search space set configuration comprises: a "pagingSearchSpace" search space set or a "searchSpaceZero" search space set, or the search space set in the 3GPP Release 16 search space set configuration comprises a search space set for DCI format 2_6 for a connected mode UE wakeup PDCCH.

Clause 20. The method of any of clauses 17 to 19, further comprising: receiving, from the base station, a set of configuration parameters for the dedicated PDCCH, wherein the set of configuration parameters comprise: a radio network temporary identifier (RNTI) for cyclic redundancy check (CRC) scrambling of DCI for the dedicated PDCCH, an offset from a start of a search time of the dedicated PDCCH to a start of the next PO, a minimum time gap between an end of a slot for dedicated PDCCH monitoring to a start of the next PO, a size of the DCI of the dedicated PDCCH, a number of bits for an indication field for each of a plurality of UE groups, a detection flag indicating whether the UE is expected to process the next PO based on the dedicated PDCCH not being detected, a repetition factor indicating how many PMOs of the dedicated PDCCH are transmitted on each of the plurality of beams for the next PO, or any combination thereof, and wherein the set of configuration parameters is received in: an RRC release message, an RRC message within a "PDCCH-ConfigCommon" information element, a system information block (SIB), a SIB type 1 (SIB1), or a PDSCH scheduled by a paging PDCCH.

Clause 21. The method of clause 20, wherein: a starting bit of the indication field is determined based on a PO index of the UE, a UE group index, a number of bits for each indication field, or any combination thereof, the starting bit of a UE group i_g in a PO i_s is determined as (i_s*N_g+ i_g)*N_b, where N_g is a number of UE groups in the same PO and N_b is the number of bits for each indication field, or based on PIs for UEs associated with different POs being separately transmitted in different PDCCHs, the starting bit of the UE group i_g in the PO i_s is i_g*N_b.

Clause 22. The method of any of clauses 1 to 21, wherein: the PI comprises a reference signal or sequence, and a configuration of the reference signal or sequence is received in: an RRC release message, an RRC message within a "PDCCH-ConfigCommon" information element, a system information block (SIB), a SIB type 1 (SIB1), or a PDSCH scheduled by a paging PDCCH.

Clause 23. The method of clause 22, further comprising: receiving, from the base station, a set of configuration parameters for the reference signal or sequence, wherein the set of configuration parameters comprise: an offset from a start of a search time of the reference signal or sequence to a start of the next PO, a minimum time gap between an end of a slot of the reference signal or sequence to the start of the next PO, a detection flag indicating whether the UE is expected to process the next PO based on the reference signal or sequence not being detected, a repetition factor indicating how many transmissions of the reference signal or sequence are transmitted on each beam of the plurality of beams in the next PO, an availability of the reference signal or sequence, or any combination thereof.

Clause 24. The method of any of clauses 22 to 23, further comprising: determining UE group information for the UE based on a mapping from an index of the reference signal or sequence to a UE group index for the UE group information.

Clause 25. The method of any of clauses 22 to 24, wherein: the reference signal or sequence is transmitted by the base station on a plurality of SSB beams, and each repetition of the reference signal or sequence is quasi-co-located with an SSB transmitted by the base station.

Clause 26. The method of any of clauses 1 to 25, wherein: a reference signal or sequence with index i_rs is mapped to UE group i_gbased on mod(i_rs−i_g, N_g) equaling 0, and N_g is a number of UE groups in the next PO.

Clause 27. The method of any of clauses 1 to 26, further comprising: based on the PI indicating that the UE is paged in the next PO, waking up to receive a page in the next PO; or based on the PI indicating that the UE is not paged in the next PO, ignoring the next PO, wherein the UE is in an RRC idle state or an RRC inactive state.

Clause 28. A user equipment (UE), comprising: a memory; at least one transceiver; and at least one processor communicatively coupled to the memory and the at least one transceiver, the at least one processor configured to: receive, via the at least one transceiver, from a base station, before a next paging occasion (PO) of a paging cycle, a page indication (PI) in a first PI location associated with the next PO, wherein the PI comprises at least one repetition of a plurality of repetitions of the PI transmitted in the first PI location on each of a plurality of beams; and decode the PI to determine whether or not the UE is paged in the next PO.

Clause 29. The UE of clause 28, wherein: PIs are transmitted at a single location for the next PO of the paging cycle, and the first PI location is the single location.

Clause 30. The UE of clause 29, wherein: the single location is before a synchronization signal block (SSB) occasion or a reference signal occasion associated with the next PO, or the single location is after the SSB occasion or the reference signal occasion associated with the next PO.

Clause 31. The UE of any of clauses 28 to 30, wherein PIs are transmitted at multiple locations for the next PO of the paging cycle.

Clause 32. The UE of any of clauses 28 to 31, wherein the PI is received in the first PI location based on channel conditions of a channel between the UE and the base station.

Clause 33. The UE of any of clauses 28 to 32, wherein: each of the plurality of beams is associated with an SSB transmitted by the base station, each of the plurality of beams is quasi-co-located with an SSB transmitted by the base station, or any combination thereof.

Clause 34. The UE of any of clauses 28 to 33, wherein: the PI comprises a physical downlink control channel (PDCCH)-based PI, and the plurality of beams and the plurality of repetitions are applied across a plurality of consecutive PDCCH monitoring occasions (PMOs).

Clause 35. The UE of any of clauses 28 to 34, wherein: the PI comprises a reference signal (RS)-based PI, the plurality of beams and the plurality of repetitions are applied across a plurality of consecutive reference signal transmissions, and each of the plurality of reference signal transmissions comprise a reference signal sequence.

Clause 36. The UE of any of clauses 28 to 35, wherein a first repetition of the plurality of repetitions of the PI is transmitted in the first PI location on each of the plurality of beams before a second repetition of the plurality of repetitions of the PI is transmitted in the first PI location on each of the plurality of beams.

Clause 37. The UE of any of clauses 28 to 36, wherein all of the plurality of repetitions of the PI are transmitted in the first PI location on a first beam of the plurality of beams before all of the plurality of repetitions of the PI are transmitted in the first PI location on a second beam of the plurality of beams.

Clause 38. The UE of any of clauses 28 to 37, wherein: the PI comprises a paging PDCCH with cross-slot scheduling to an associated physical downlink shared channel (PDSCH), the base station does not transmit on different beams of the plurality of beams between the paging PDCCH and the associated PDSCH, the base station transmits on different beams of the plurality of beams between the paging PDCCH and the associated PDSCH, or the paging PDCCH and the associated PDSCH are transmitted with a gap where PMOs from the next PO are not transmitted by the base station.

Clause 39. The UE of any of clauses 28 to 38, wherein: the PI comprises a paging PDCCH with cross-slot scheduling to an associated PDSCH, and the at least one processor is further configured to: receive, via the at least one transceiver, from the base station, a radio resource control (RRC) configuration for the paging PDCCH to act as the PI.

Clause 40. The UE of any of clauses 28 to 39, wherein: the PI comprises a paging PDCCH with cross-slot scheduling to an associated PDSCH, and the at least one processor is further configured to: receive, via the at least one transceiver, from the base station, downlink control information (DCI) providing scheduling information for the associated PDSCH.

Clause 41. The UE of any of clauses 28 to 40, wherein: the PI comprises a paging PDCCH with cross-slot scheduling to an associated PDSCH, and the at least one processor is further configured to: receive, via the at least one transceiver, from the base station, a PDSCH scheduling offset $K\_0$ indicating a number of slots between the paging PDCCH and the associated PDSCH, wherein: the PDSCH scheduling offset $K\_0$ is provided in a time domain resource allocation (TDRA) table dedicated for idle or inactive state UEs, a value of the PDSCH scheduling offset $K\_0$ is greater than 32 slots, the TDRA table comprises a default TDRA table and a configurable TDRA table, the default TDRA table is specified in a wireless communications standard, and the configurable TDRA table is provided in a cell-specific PDSCH configuration message.

Clause 42. The UE of any of clauses 28 to 41, wherein: the PI comprises a paging PDCCH with cross-slot scheduling to an associated PDSCH, and the at least one processor is further configured to: receive, via the at least one transceiver, from the base station, a time offset indicating a number of slots between the paging PDCCH and the associated PDSCH, wherein: the time offset is added to a time domain reference point, the time domain reference point comprises a PDSCH scheduling offset $K\_0$, based on the PI being transmitted at multiple locations, a factor n is multiplied to the time offset for an n-th PI location before legacy PMOs in the next PO, the time domain reference point comprises a starting slot of a next PO for legacy PMOs.

Clause 43. The UE of any of clauses 28 to 42, wherein PMOs of the PI are scheduled to not collide with any PMOs for legacy UEs associated with different PO indices.

Clause 44. The UE of any of clauses 28 to 43, wherein: the PI comprises a dedicated PDCCH, a search space set is defined for the dedicated PDCCH, and a search space set configuration for the search space set comprises: a Third Generation Partnership Project (3GPP) Release 15 search space set configuration, a 3GPP Release 16 search space set configuration, or a 3GPP Release 17 search space set configuration.

Clause 45. The UE of clause 44, wherein the search space set is linked to a common control resource set (CORESET) or a CORESET #0 based on a CORESET identifier in the search space set configuration.

Clause 46. The UE of any of clauses 44 to 45, wherein: the search space set in the 3GPP Release 15 search space set configuration comprises: a "pagingSearchSpace" search space set or a "searchSpaceZero" search space set, or the search space set in the 3GPP Release 16 search space set configuration comprises a search space set for DCI format 2_6 for a connected mode UE wakeup PDCCH.

Clause 47. The UE of any of clauses 44 to 46, wherein the at least one processor is further configured to: receive, via the at least one transceiver, from the base station, a set of configuration parameters for the dedicated PDCCH, wherein the set of configuration parameters comprise: a radio network temporary identifier (RNTI) for cyclic redundancy check (CRC) scrambling of DCI for the dedicated PDCCH, an offset from a start of a search time of the dedicated PDCCH to a start of the next PO, a minimum time gap between an end of a slot for dedicated PDCCH monitoring to a start of the next PO, a size of the DCI of the dedicated PDCCH, a number of bits for an indication field for each of a plurality of UE groups, a detection flag indicating whether the UE is expected to process the next PO based on the dedicated PDCCH not being detected, a repetition factor indicating how many PMOs of the dedicated PDCCH are transmitted on each of the plurality of beams for the next PO, or any combination thereof, and wherein the set of configuration parameters is received in: an RRC release message, an RRC message within a "PDCCH-ConfigCommon" information element, a system information block (SIB), a SIB type 1 (SIB1), or a PDSCH scheduled by a paging PDCCH.

Clause 48. The UE of any of clauses 46 to 47, wherein: a starting bit of the indication field is determined based on a PO index of the UE, a UE group index, a number of bits for each indication field, or any combination thereof, the starting bit of a UE group i_g in a PO i_s is determined as (i_s*N_g+i_g)*N_b, where N_g is a number of UE groups in the same PO and N_b is the number of bits for each indication field, or based on PIs for UEs associated with different POs being separately transmitted in different PDCCHs, the starting bit of the UE group i_g in the PO i_s is i_g*N_b.

Clause 49. The UE of any of clauses 28 to 48, wherein: the PI comprises a reference signal or sequence, and a configuration of the reference signal or sequence is received in: an RRC release message, an RRC message within a "PDCCH-ConfigCommon" information element, a system information block (SIB), a SIB type 1 (SIB1), or a PDSCH scheduled by a paging PDCCH.

Clause 50. The method of clause 49, wherein the at least one processor is further configured to: receive, via the at least one transceiver, from the base station, a set of configuration parameters for the reference signal or sequence, wherein the set of configuration parameters comprise: an offset from a start of a search time of the reference signal or sequence to a start of the next PO, a minimum time gap between an end of a slot of the reference signal or sequence to the start of the next PO, a detection flag indicating whether the UE is expected to process the next PO based on the reference signal or sequence not being detected, a repetition factor indicating how many transmissions of the reference signal or sequence are transmitted on each beam of the plurality of beams in the next PO, an availability of the reference signal or sequence, or any combination thereof.

Clause 51. The UE of any of clauses 49 to 50, wherein the at least one processor is further configured to: determine UE group information for the UE based on a mapping from an index of the reference signal or sequence to a UE group index for the UE group information.

Clause 52. The UE of any of clauses 49 to 51, wherein: the reference signal or sequence is transmitted by the base station on a plurality of SSB beams, and each repetition of the reference signal or sequence is quasi-co-located with an SSB transmitted by the base station.

Clause 53. The UE of any of clauses 28 to 52, wherein: a reference signal or sequence with index i_rs is mapped to UE group i_gbased on mod(i_rs−i_g, N_g) equaling 0, and N_g is a number of UE groups in the next PO.

Clause 54. The UE of any of clauses 28 to 53, wherein the at least one processor is further configured to: based on the PI indicating that the UE is paged in the next PO, wake up to receive a page in the next PO; or based on the PI indicating that the UE is not paged in the next PO, ignore the next PO, wherein the UE is in an RRC idle state or an RRC inactive state.

Clause 55. A user equipment (UE), comprising: means for receiving, from a base station, before a next paging occasion (PO) of a paging cycle, a page indication (PI) in a first PI location associated with the next PO, wherein the PI comprises at least one repetition of a plurality of repetitions of the PI transmitted in the first PI location on each of a plurality of beams; and means for decoding the PI to determine whether or not the UE is paged in the next PO.

Clause 56. The UE of clause 55, wherein: PIs are transmitted at a single location for the next PO of the paging cycle, and the first PI location is the single location.

Clause 57. The UE of clause 56, wherein: the single location is before a synchronization signal block (SSB) occasion or a reference signal occasion associated with the next PO, or the single location is after the SSB occasion or the reference signal occasion associated with the next PO.

Clause 58. The UE of any of clauses 55 to 57, wherein PIs are transmitted at multiple locations for the next PO of the paging cycle.

Clause 59. The UE of any of clauses 55 to 58, wherein the PI is received in the first PI location based on channel conditions of a channel between the UE and the base station.

Clause 60. The UE of any of clauses 55 to 59, wherein: each of the plurality of beams is associated with an SSB transmitted by the base station, each of the plurality of beams is quasi-co-located with an SSB transmitted by the base station, or any combination thereof.

Clause 61. The UE of any of clauses 55 to 60, wherein: the PI comprises a physical downlink control channel (PDCCH)-based PI, and the plurality of beams and the plurality of repetitions are applied across a plurality of consecutive PDCCH monitoring occasions (PMOs).

Clause 62. The UE of any of clauses 55 to 61, wherein: the PI comprises a reference signal (RS)-based PI, the plurality of beams and the plurality of repetitions are applied across a plurality of consecutive reference signal transmissions, and each of the plurality of reference signal transmissions comprise a reference signal sequence.

Clause 63. The UE of any of clauses 55 to 62, wherein a first repetition of the plurality of repetitions of the PI is transmitted in the first PI location on each of the plurality of beams before a second repetition of the plurality of repetitions of the PI is transmitted in the first PI location on each of the plurality of beams.

Clause 64. The UE of any of clauses 55 to 63, wherein all of the plurality of repetitions of the PI are transmitted in the first PI location on a first beam of the plurality of beams before all of the plurality of repetitions of the PI are transmitted in the first PI location on a second beam of the plurality of beams.

Clause 65. The UE of any of clauses 55 to 64, wherein: the PI comprises a paging PDCCH with cross-slot scheduling to an associated physical downlink shared channel (PDSCH), the base station does not transmit on different beams of the plurality of beams between the paging PDCCH and the associated PDSCH, the base station transmits on different beams of the plurality of beams between the paging PDCCH and the associated PDSCH, or the paging PDCCH and the associated PDSCH are transmitted with a gap where PMOs from the next PO are not transmitted by the base station.

Clause 66. The UE of any of clauses 55 to 65, wherein: the PI comprises a paging PDCCH with cross-slot scheduling to an associated PDSCH, and the method further comprises: receiving, from the base station, a radio resource control (RRC) configuration for the paging PDCCH to act as the PI.

Clause 67. The UE of any of clauses 55 to 66, wherein: the PI comprises a paging PDCCH with cross-slot scheduling to an associated PDSCH, and the method further comprises: receiving, from the base station, downlink control information (DCI) providing scheduling information for the associated PDSCH.

Clause 68. The UE of any of clauses 55 to 67, wherein: the PI comprises a paging PDCCH with cross-slot scheduling to an associated PDSCH, and the method further comprises: receiving, from the base station, a PDSCH scheduling offset K_0 indicating a number of slots between the paging PDCCH and the associated PDSCH, wherein: the PDSCH scheduling offset K_0 is provided in a time domain resource allocation (TDRA) table dedicated for idle or inactive state UEs, a value of the PDSCH scheduling offset K_0 is greater than 32 slots, the TDRA table comprises a default TDRA table and a configurable TDRA table, the default TDRA table is specified in a wireless communications standard, and the configurable TDRA table is provided in a cell-specific PDSCH configuration message.

Clause 69. The UE of any of clauses 55 to 68, wherein: the PI comprises a paging PDCCH with cross-slot scheduling to an associated PDSCH, and the method further comprises: receiving, from the base station, a time offset indicating a number of slots between the paging PDCCH and the associated PDSCH, wherein: the time offset is added to a time domain reference point, the time domain reference point comprises a PDSCH scheduling offset K_0, based on the PI being transmitted at multiple locations, a factor n is multiplied to the time offset for an n-th PI location before legacy PMOs in the next PO, the time domain reference point comprises a starting slot of a next PO for legacy PMOs.

Clause 70. The UE of any of clauses 55 to 69, wherein PMOs of the PI are scheduled to not collide with any PMOs for legacy UEs associated with different PO indices.

Clause 71. The UE of any of clauses 55 to 70, wherein: the PI comprises a dedicated PDCCH, a search space set is defined for the dedicated PDCCH, and a search space set configuration for the search space set comprises: a Third Generation Partnership Project (3GPP) Release 15 search space set configuration, a 3GPP Release 16 search space set configuration, or a 3GPP Release 17 search space set configuration.

Clause 72. The UE of clause 71, wherein the search space set is linked to a common control resource set (CORESET) or a CORESET #0 based on a CORESET identifier in the search space set configuration.

Clause 73. The UE of any of clauses 71 to 72, wherein: the search space set in the 3GPP Release 15 search space set configuration comprises: a "pagingSearchSpace" search space set or a "searchSpaceZero" search space set, or the search space set in the 3GPP Release 16 search space set configuration comprises a search space set for DCI format 2_6 for a connected mode UE wakeup PDCCH.

Clause 74. The UE of any of clauses 71 to 73, further comprising: receiving, from the base station, a set of configuration parameters for the dedicated PDCCH, wherein the set of configuration parameters comprise: a radio network temporary identifier (RNTI) for cyclic redundancy check (CRC) scrambling of DCI for the dedicated PDCCH, an offset from a start of a search time of the dedicated PDCCH to a start of the next PO, a minimum time gap between an end of a slot for dedicated PDCCH monitoring to a start of the next PO, a size of the DCI of the dedicated PDCCH, a number of bits for an indication field for each of a plurality of UE groups, a detection flag indicating whether the UE is expected to process the next PO based on the dedicated PDCCH not being detected, a repetition factor indicating how many PMOs of the dedicated PDCCH are transmitted on each of the plurality of beams for the next PO, or any combination thereof, and wherein the set of configuration parameters is received in: an RRC release message, an RRC message within a "PDCCH-ConfigCommon" information element, a system information block (SIB), a SIB type 1 (SIB1), or a PDSCH scheduled by a paging PDCCH.

Clause 75. The UE of clause 74, wherein: a starting bit of the indication field is determined based on a PO index of the UE, a UE group index, a number of bits for each indication field, or any combination thereof, the starting bit of a UE group i_g in a PO i_s is determined as $(i\_s*N\_g+i\_g)*N\_b$, where N_g is a number of UE groups in the same PO and N_b is the number of bits for each indication field, or based on PIs for UEs associated with different POs being separately transmitted in different PDCCHs, the starting bit of the UE group i_g in the PO i_s is $i\_g*N\_b$.

Clause 76. The UE of any of clauses 55 to 75, wherein: the PI comprises a reference signal or sequence, and a configuration of the reference signal or sequence is received in: an RRC release message, an RRC message within a "PDCCH-ConfigCommon" information element, a system information block (SIB), a SIB type 1 (SIB1), or a PDSCH scheduled by a paging PDCCH.

Clause 77. The UE of clause 76, further comprising: receiving, from the base station, a set of configuration parameters for the reference signal or sequence, wherein the set of configuration parameters comprise: an offset from a start of a search time of the reference signal or sequence to a start of the next PO, a minimum time gap between an end of a slot of the reference signal or sequence to the start of the next PO, a detection flag indicating whether the UE is expected to process the next PO based on the reference signal or sequence not being detected, a repetition factor indicating how many transmissions of the reference signal or sequence are transmitted on each beam of the plurality of beams in the next PO, an availability of the reference signal or sequence, or any combination thereof.

Clause 78. The UE of any of clauses 76 to 77, further comprising: determining UE group information for the UE based on a mapping from an index of the reference signal or sequence to a UE group index for the UE group information.

Clause 79. The UE of any of clauses 76 to 78, wherein: the reference signal or sequence is transmitted by the base station on a plurality of SSB beams, and each repetition of the reference signal or sequence is quasi-co-located with an SSB transmitted by the base station.

Clause 80. The UE of any of clauses 55 to 79, wherein: a reference signal or sequence with index i_rs is mapped to UE group i_g based on $mod(i\_rs-i\_g, N\_g)$ equaling 0, and N_g is a number of UE groups in the next PO.

Clause 81. The UE of any of clauses 55 to 80, further comprising: based on the PI indicating that the UE is paged in the next PO, waking up to receive a page in the next PO; or based on the PI indicating that the UE is not paged in the next PO, ignoring the next PO, wherein the UE is in an RRC idle state or an RRC inactive state.

Clause 82. A non-transitory computer-readable medium storing computer-executable instructions that, when executed by a user equipment (UE), cause the UE to: receive, from a base station, before a next paging occasion (PO) of a paging cycle, a page indication (PI) in a first PI location associated with the next PO, wherein the PI comprises at least one repetition of a plurality of repetitions of the PI transmitted in the first PI location on each of a plurality of beams; and decode the PI to determine whether or not the UE is paged in the next PO.

Clause 83. The non-transitory computer-readable medium of any of clauses 72 to 82, wherein: PIs are transmitted at a single location for the next PO of the paging cycle, and the first PI location is the single location.

Clause 84. The non-transitory computer-readable medium of any of clauses 73 to 83, wherein: the single location is before a synchronization signal block (SSB) occasion or a reference signal occasion associated with the next PO, or the single location is after the SSB occasion or the reference signal occasion associated with the next PO.

Clause 85. The non-transitory computer-readable medium of any of clauses 72 to 84, wherein PIs are transmitted at multiple locations for the next PO of the paging cycle.

Clause 86. The non-transitory computer-readable medium of any of clauses 72 to 85, wherein the PI is received in the first PI location based on channel conditions of a channel between the UE and the base station.

Clause 87. The non-transitory computer-readable medium of any of clauses 72 to 86, wherein: each of the plurality of beams is associated with an SSB transmitted by the base station, each of the plurality of beams is quasi-co-located with an SSB transmitted by the base station, or any combination thereof.

Clause 88. The non-transitory computer-readable medium of any of clauses 72 to 87, wherein: the PI comprises a physical downlink control channel (PDCCH)-based PI, and the plurality of beams and the plurality of repetitions are applied across a plurality of consecutive PDCCH monitoring occasions (PMOs).

Clause 89. The non-transitory computer-readable medium of any of clauses 72 to 88, wherein: the PI comprises a reference signal (RS)-based PI, the plurality of beams and the plurality of repetitions are applied across a plurality of consecutive reference signal transmissions, and each of the plurality of reference signal transmissions comprise a reference signal sequence.

Clause 90. The non-transitory computer-readable medium of any of clauses 72 to 89, wherein a first repetition of the plurality of repetitions of the PI is transmitted in the first PI location on each of the plurality of beams before a second repetition of the plurality of repetitions of the PI is transmitted in the first PI location on each of the plurality of beams.

Clause 91. The non-transitory computer-readable medium of any of clauses 72 to 90, wherein all of the plurality of repetitions of the PI are transmitted in the first PI location on a first beam of the plurality of beams before all of the plurality of repetitions of the PI are transmitted in the first PI location on a second beam of the plurality of beams.

Clause 92. The non-transitory computer-readable medium of any of clauses 72 to 91, wherein: the PI comprises a paging PDCCH with cross-slot scheduling to an associated physical downlink shared channel (PDSCH), the base station does not transmit on different beams of the plurality of beams between the paging PDCCH and the associated PDSCH, the base station transmits on different beams of the plurality of beams between the paging PDCCH and the associated PDSCH, or the paging PDCCH and the associated PDSCH are transmitted with a gap where PMOs from the next PO are not transmitted by the base station.

Clause 93. The non-transitory computer-readable medium of any of clauses 72 to 92, wherein: the PI comprises a paging PDCCH with cross-slot scheduling to an associated PDSCH, and the method further comprises: receive, from the base station, a radio resource control (RRC) configuration for the paging PDCCH to act as the PI.

Clause 94. The non-transitory computer-readable medium of any of clauses 72 to 93, wherein: the PI comprises a paging PDCCH with cross-slot scheduling to an associated PDSCH, and the method further comprises: receive, from the base station, downlink control information (DCI) providing scheduling information for the associated PDSCH.

Clause 95. The non-transitory computer-readable medium of any of clauses 72 to 94, wherein: the PI comprises a paging PDCCH with cross-slot scheduling to an associated PDSCH, and the method further comprises: receiving, from the base station, a PDSCH scheduling offset K_0 indicating a number of slots between the paging PDCCH and the associated PDSCH, wherein: the PDSCH scheduling offset K_0 is provided in a time domain resource allocation (TDRA) table dedicated for idle or inactive state UEs, a value of the PDSCH scheduling offset K_0 is greater than 32 slots, the TDRA table comprises a default TDRA table and a configurable TDRA table, the default TDRA table is specified in a wireless communications standard, and the configurable TDRA table is provided in a cell-specific PDSCH configuration message.

Clause 96. The non-transitory computer-readable medium of any of clauses 72 to 95, wherein: the PI comprises a paging PDCCH with cross-slot scheduling to an associated PDSCH, and the method further comprises: receiving, from the base station, a time offset indicating a number of slots between the paging PDCCH and the associated PDSCH, wherein: the time offset is added to a time domain reference point, the time domain reference point comprises a PDSCH scheduling offset K_0, based on the PI being transmitted at multiple locations, a factor n is multiplied to the time offset for an n-th PI location before legacy PMOs in the next PO, the time domain reference point comprises a starting slot of a next PO for legacy PMOs.

Clause 97. The non-transitory computer-readable medium of any of clauses 72 to 96, wherein PMOs of the PI are scheduled to not collide with any PMOs for legacy UEs associated with different PO indices.

Clause 98. The non-transitory computer-readable medium of any of clauses 72 to 97, wherein: the PI comprises a dedicated PDCCH, a search space set is defined for the dedicated PDCCH, and a search space set configuration for the search space set comprises: a Third Generation Partnership Project (3GPP) Release 15 search space set configuration, a 3GPP Release 16 search space set configuration, or a 3GPP Release 17 search space set configuration.

Clause 99. The non-transitory computer-readable medium of any of clauses 88 to 98, wherein the search space set is linked to a common control resource set (CORESET) or a CORESET #0 based on a CORESET identifier in the search space set configuration.

Clause 100. The non-transitory computer-readable medium of any of clauses 88 to 99, wherein: the search space set in the 3GPP Release 15 search space set configuration comprises: a "pagingSearchSpace" search space set or a "searchSpaceZero" search space set, or the search space set in the 3GPP Release 16 search space set configuration comprises a search space set for DCI format 2_6 for a connected mode UE wakeup PDCCH.

Clause 101. The non-transitory computer-readable medium of any of clauses 90 to 100, wherein: a starting bit of the indication field is determined based on a PO index of the UE, a UE group index, a number of bits for each indication field, or any combination thereof, the starting bit of a UE group i_g in a PO i_s is determined as $(i\_s*N\_g+i\_g)*N\_b$, where N_g is a number of UE groups in the same PO and N_b is the number of bits for each indication field, or based on PIs for UEs associated with different POs being separately transmitted in different PDCCHs, the starting bit of the UE group i_g in the PO i_s is $i\_g*N\_b$.

Clause 102. The non-transitory computer-readable medium of any of clauses 89 to 101, wherein: the reference signal or sequence is transmitted by the base station on a plurality of SSB beams, and each repetition of the reference signal or sequence is quasi-co-located with an SSB transmitted by the base station.

Clause 103. The non-transitory computer-readable medium of any of clauses 68 to 102, wherein: a reference signal or sequence with index i_rs is mapped to UE group i_g based on mod(i_rs−i_g, N_g) equaling 0, and N_g is a number of UE groups in the next PO.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
   receiving, from a base station, before a next paging occasion (PO) of a paging cycle, a page indication (PI) in at least a first PI location associated with the next PO, wherein the PI comprises at least one repetition of a plurality of repetitions of the PI transmitted in the first PI location on each of a plurality of beams, wherein the PI is transmitted at multiple PI locations, including the first PI location, before the next PO on each of the plurality of beams, and wherein the UE receives the PI in at least the first PI location based on channel conditions of a channel between the UE and the base station; and
   decoding the PI to determine whether or not the UE is paged in the next PO.

2. The method of claim 1, wherein:
   the first location is before a synchronization signal block (SSB) occasion or a reference signal occasion associated with the next PO, or
   the first location is after the SSB occasion or the reference signal occasion associated with the next PO.

3. The method of claim 1, wherein:
each of the plurality of beams is associated with an SSB transmitted by the base station,
each of the plurality of beams is quasi-co-located with an SSB transmitted by the base station, or
any combination thereof.

4. The method of claim 1, wherein:
the PI comprises a physical downlink control channel (PDCCH)-based PI, and
the plurality of beams and the plurality of repetitions are applied across a plurality of consecutive PDCCH monitoring occasions (PMOs).

5. The method of claim 1, wherein:
the PI comprises a reference signal (RS)-based PI,
the plurality of beams and the plurality of repetitions are applied across a plurality of consecutive reference signal transmissions, and
each of the plurality of reference signal transmissions comprise a reference signal sequence.

6. The method of claim 1, wherein a first repetition of the plurality of repetitions of the PI is transmitted in the first PI location on each of the plurality of beams before a second repetition of the plurality of repetitions of the PI is transmitted in the first PI location on each of the plurality of beams.

7. The method of claim 1, wherein all of the plurality of repetitions of the PI are transmitted in the first PI location on a first beam of the plurality of beams before all of the plurality of repetitions of the PI are transmitted in the first PI location on a second beam of the plurality of beams.

8. The method of claim 1, wherein:
the PI comprises a paging PDCCH with cross-slot scheduling to an associated physical downlink shared channel (PDSCH),
the base station does not transmit on different beams of the plurality of beams between the paging PDCCH and the associated PDSCH,
the base station transmits on different beams of the plurality of beams between the paging PDCCH and the associated PDSCH, or
the paging PDCCH and the associated PDSCH are transmitted with a gap where PMOs from the next PO are not transmitted by the base station.

9. The method of claim 1, wherein:
the PI comprises a paging PDCCH with cross-slot scheduling to an associated PDSCH, and
the method further comprises:
receiving, from the base station, a radio resource control (RRC) configuration for the paging PDCCH to act as the PI.

10. The method of claim 1, wherein:
the PI comprises a paging PDCCH with cross-slot scheduling to an associated PDSCH, and
the method further comprises:
receiving, from the base station, downlink control information (DCI) providing scheduling information for the associated PDSCH.

11. The method of claim 1, wherein:
the PI comprises a paging PDCCH with cross-slot scheduling to an associated PDSCH, and
the method further comprises:
receiving, from the base station, a PDSCH scheduling offset K_0 indicating a number of slots between the paging PDCCH and the associated PDSCH, wherein:
the PDSCH scheduling offset K_0 is provided in a time domain resource allocation (TDRA) table dedicated for idle or inactive state UEs,
a value of the PDSCH scheduling offset K_0 is greater than 32 slots,
the TDRA table comprises a default TDRA table and a configurable TDRA table,
the default TDRA table is specified in a wireless communications standard, and
the configurable TDRA table is provided in a cell-specific PDSCH configuration message.

12. The method of claim 1, wherein:
the PI comprises a paging PDCCH with cross-slot scheduling to an associated PDSCH, and
the method further comprises:
receiving, from the base station, a time offset indicating a number of slots between the paging PDCCH and the associated PDSCH, wherein:
the time offset is added to a time domain reference point,
the time domain reference point comprises a PDSCH scheduling offset K_0,
based on the PI being transmitted at multiple locations, a factor n is multiplied to the time offset for an n-th PI location before legacy PMOs in the next PO,
the time domain reference point comprises a starting slot of a next PO for legacy PMOs.

13. The method of claim 1, wherein PMOs of the PI are scheduled to not collide with any PMOs for legacy UEs associated with different PO indices.

14. The method of claim 1, wherein:
the PI comprises a dedicated PDCCH,
a search space set is defined for the dedicated PDCCH, and
a search space set configuration for the search space set comprises:
a Third Generation Partnership Project (3GPP) Release 15 search space set configuration,
a 3GPP Release 16 search space set configuration, or
a 3GPP Release 17 search space set configuration.

15. The method of claim 14, wherein the search space set is linked to a common control resource set (CORESET) or a CORESET#0 based on a CORESET identifier in the search space set configuration.

16. The method of claim 14, wherein:
the search space set in the 3GPP Release 15 search space set configuration comprises: a "pagingSearchSpace" search space set or a "searchSpaceZero" search space set, or
the search space set in the 3GPP Release 16 search space set configuration comprises a search space set for DCI format 2_6 for a connected mode UE wakeup PDCCH.

17. The method of claim 14, further comprising:
receiving, from the base station, a set of configuration parameters for the dedicated PDCCH,
wherein the set of configuration parameters comprise:
a radio network temporary identifier (RNTI) for cyclic redundancy check (CRC) scrambling of DCI for the dedicated PDCCH,
an offset from a start of a search time of the dedicated PDCCH to a start of the next PO,
a minimum time gap between an end of a slot for dedicated PDCCH monitoring to a start of the next PO,
a size of the DCI of the dedicated PDCCH,
a number of bits for an indication field for each of a plurality of UE groups,
a detection flag indicating whether the UE is expected to process the next PO based on the dedicated PDCCH not being detected, a repetition factor indicating how many PMOs of the dedicated PDCCH are transmitted on each of the plurality of beams for the next PO, or any combination thereof, and wherein the set of configuration parameters is received in:
an RRC release message,
an RRC message within a "PDCCH-ConfigCommon" information element,
a system information block (SIB),
a SIB type 1 (SIB1), or
a PDSCH scheduled by a paging PDCCH.

18. The method of claim 17, wherein:
a starting bit of the indication field is determined based on a PO index of the UE, a UE group index, a number of bits for each indication field, or any combination thereof,
the starting bit of a UE group i_g in a PO i_s is determined as (i_s * N_g+i_g) * N_b, where N_g is a number of UE groups in the same PO and N_b is the number of bits for each indication field, or
based on PIs for UEs associated with different POs being separately transmitted in different PDCCHs, the starting bit of the UE group i_g in the PO i_s is i_g * N_b.

19. The method of claim 1, wherein:
the PI comprises a reference signal or sequence, and
a configuration of the reference signal or sequence is received in:
an RRC release message,
an RRC message within a "PDCCH-ConfigCommon" information element,
a system information block (SIB),
a SIB type 1 (SIB1), or
a PDSCH scheduled by a paging PDCCH.

20. The method of claim 19, further comprising:
receiving, from the base station, a set of configuration parameters for the reference signal or sequence,
wherein the set of configuration parameters comprise:
an offset from a start of a search time of the reference signal or sequence to a start of the next PO,
a minimum time gap between an end of a slot of the reference signal or sequence to the start of the next PO,
a detection flag indicating whether the UE is expected to process the next PO based on the reference signal or sequence not being detected,
a repetition factor indicating how many transmissions of the reference signal or sequence are transmitted on each beam of the plurality of beams in the next PO,
an availability of the reference signal or sequence, or any combination thereof.

21. The method of claim 19, further comprising:
determining UE group information for the UE based on a mapping from an index of the reference signal or sequence to a UE group index for the UE group information.

22. The method of claim 19, wherein:
the reference signal or sequence is transmitted by the base station on a plurality of SSB beams, and
each repetition of the reference signal or sequence is quasi-co-located with an SSB transmitted by the base station.

23. The method of claim 1, wherein:
a reference signal or sequence with index i_rs is mapped to UE group i_g based on mod(i_rs−i_g, N_g) equaling 0, and
N_g is a number of UE groups in the next PO.

24. The method of claim 1, further comprising:
based on the PI indicating that the UE is paged in the next PO, waking up to receive a page in the next PO; or
based on the PI indicating that the UE is not paged in the next PO, ignoring the next PO,
wherein the UE is in an RRC idle state or an RRC inactive state.

25. A user equipment (UE), comprising:
one or more memories;
one or more transceivers; and
one or more processors communicatively coupled to the one or more memories and the one or more transceivers, the one or more processors, either alone or in combination, configured to:
receive, via the one or more transceivers, from a base station, before a next paging occasion (PO) of a paging cycle, a page indication (PI) in at least a first PI location associated with the next PO, wherein the PI comprises at least one repetition of a plurality of repetitions of the PI transmitted in the first PI location on each of a plurality of beams, wherein the PI is transmitted at multiple PI locations, including the first PI location, before the next PO on each of the plurality of beams, and wherein the UE receives the PI in at least the first PI location based on channel conditions of a channel between the UE and the base station; and
decode the PI to determine whether or not the UE is paged in the next PO.

26. The UE of claim 25, wherein:
the first location is before a synchronization signal block (SSB) occasion or a reference signal occasion associated with the next PO, or
the first location is after the SSB occasion or the reference signal occasion associated with the next PO.

27. The UE of claim 25, wherein:
each of the plurality of beams is associated with an SSB transmitted by the base station,
each of the plurality of beams is quasi-co-located with an SSB transmitted by the base station, or
any combination thereof.

28. The UE of claim 25, wherein:
the PI comprises a physical downlink control channel (PDCCH)-based PI, and
the plurality of beams and the plurality of repetitions are applied across a plurality of consecutive PDCCH monitoring occasions (PMOs).

29. A user equipment (UE), comprising:
means for receiving, from a base station, before a next paging occasion (PO) of a paging cycle, a page indication (PI) in at least a first PI location associated with the next PO, wherein the PI comprises at least one repetition of a plurality of repetitions of the PI transmitted in the first PI location on each of a plurality of beams, wherein the PI is transmitted at multiple PI locations, including the first PI location, before the next PO on each of the plurality of beams, and wherein the UE receives the PI in at least the first PI location based on channel conditions of a channel between the UE and the base station; and
means for decoding the PI to determine whether or not the UE is paged in the next PO.

30. A non-transitory computer-readable medium storing computer-executable instructions that, when executed by a user equipment (UE), cause the UE to:
receive, from a base station, before a next paging occasion (PO) of a paging cycle, a page indication (PI) in at least a first PI location associated with the next PO, wherein the PI comprises at least one repetition of a plurality of repetitions of the PI transmitted in the first PI location on each of a plurality of beams, wherein the PI is transmitted at multiple PI locations, including the first PI location, before the next PO on each of the plurality of beams, and wherein the UE receives the PI in at least the first PI location based on channel conditions of a channel between the UE and the base station; and decode the PI to determine whether or not the UE is paged in the next PO.

31. A method of wireless communication performed by a base station, comprising:

transmitting, to a user equipment (UE), before a next paging occasion (PO) of a paging cycle, a page indication (PI) in at least a first PI location associated with the next PO, wherein the PI comprises at least one repetition of a plurality of repetitions of the PI transmitted in the first PI location on each of a plurality of beams, wherein the PI is transmitted at multiple PI locations, including the first PI location, before the next PO on each of the plurality of beams, and wherein the UE receives the PI in at least the first PI location based on channel conditions of a channel between the UE and the base station.

32. The method of claim 31, wherein:

the first location is before a synchronization signal block (SSB) occasion or a reference signal occasion associated with the next PO, or the first location is after the SSB occasion or the reference signal occasion associated with the next PO.

33. The method of claim 31, wherein:

each of the plurality of beams is associated with an SSB transmitted by the base station, each of the plurality of beams is quasi-co-located with an SSB transmitted by the base station, or any combination thereof.

34. The method of claim 31, wherein:

the PI comprises a physical downlink control channel (PDCCH)-based PI, and the plurality of beams and the plurality of repetitions are applied across a plurality of consecutive PDCCH monitoring occasions (PMOs).

35. The method of claim 31, wherein:

the PI comprises a paging PDCCH with cross-slot scheduling to an associated PDSCH, and the method further comprises:

transmitting, to the UE, a radio resource control (RRC) configuration for the paging PDCCH to act as the PI.

36. The method of claim 31, wherein:

the PI comprises a paging PDCCH with cross-slot scheduling to an associated PDSCH, and the method further comprises:

transmitting, to the UE, downlink control information (DCI) providing scheduling information for the associated PDSCH.

37. A base station, comprising:

one or more memories;

one or more transceivers; and one or more processors communicatively coupled to the one or more memories and the one or more transceivers, the one or more processors, either alone or in combination, configured to:

transmit, via the one or more transceivers, to a user equipment (UE), before a next paging occasion (PO) of a paging cycle, a page indication (PI) in at least a first PI location associated with the next PO, wherein the PI comprises at least one repetition of a plurality of repetitions of the PI transmitted in the first PI location on each of a plurality of beams, wherein the PI is transmitted at multiple PI locations, including the first PI location, before the next PO on each of the plurality of beams, and wherein the UE receives the PI in at least the first PI location based on channel conditions of a channel between the UE and the base station.

* * * * *